United States Patent
Tanaka et al.

[19]

[11] Patent Number: 5,996,360
[45] Date of Patent: Dec. 7, 1999

[54] REFRIGERANT CYCLE SYSTEM

[75] Inventors: Masaya Tanaka, Anjo; Hiroshi Ishikawa, Hazu-gun; Satoshi Itoh, Kariya; Kunio Iritani, Anjo, all of Japan

[73] Assignee: Denso Corporation, Kariya, Japan

[21] Appl. No.: 09/186,543

[22] Filed: Nov. 5, 1998

[30] Foreign Application Priority Data

Nov. 27, 1997 [JP] Japan ................................. 9-326631
Nov. 28, 1997 [JP] Japan ................................. 9-328998

[51] Int. Cl.$^6$ ................................................ F25B 13/00
[52] U.S. Cl. ........................... 62/160; 62/159; 62/174; 62/225; 62/509
[58] Field of Search ........................... 62/159, 160, 174, 62/225, 509

[56] References Cited

U.S. PATENT DOCUMENTS

| | | | |
|---|---|---|---|
| 3,084,523 | 4/1963 | Bottum et al. | 62/296 |
| 3,212,289 | 10/1965 | Bottum | 62/468 |
| 3,324,671 | 6/1967 | Harnish | 62/174 |
| 3,754,409 | 8/1973 | Wreen, Jr. et al. | 62/503 |
| 4,583,377 | 4/1986 | Viegas | 62/503 |
| 5,551,255 | 9/1996 | Rothfleisch | 62/502 |
| 5,669,231 | 9/1997 | Itoh et al. | |
| 5,704,219 | 1/1998 | Suzuki et al. | 62/222 |
| 5,778,691 | 7/1998 | Suzuki et al. | 62/160 |

FOREIGN PATENT DOCUMENTS 3-260556  11/1991  Japan .
9-39550   2/1997   Japan .
9-86149   3/1997   Japan .

*Primary Examiner*—Henry Bennett
*Assistant Examiner*—Marc Norman
*Attorney, Agent, or Firm*—Harness, Dickey & Pierce, PLC

[57] ABSTRACT

A refrigerant cycle system includes a gas-liquid separator for separating gas-liquid refrigerant into gas refrigerant and liquid refrigerant. The gas-liquid separator has a liquid-suction pipe for introducing liquid refrigerant from the gas-liquid separator to a decompressing unit, and a gas-suction pipe for introducing gas refrigerant from the gas-liquid separator to a compressor. The gas-suction pipe has a suction hole for sucking liquid refrigerant therein, and the suction hole is provided at a position lower than an open end of the liquid-suction pipe. Because a height of a surface of liquid refrigerant in the gas-liquid separator is constantly equal to or higher than the open end of the liquid-suction pipe regardless of change in a heating load of the refrigerant cycle, liquid refrigerant is constantly sucked into the gas-suction pipe from the suction hole. Thus, liquid refrigerant in which lubricating oil is dissolved can be constantly introduced into the compressor, thereby preventing shortage of lubricating oil in the compressor. On the other hand, in the refrigerant cycle, an oil-discharging mode is selectively set at a starting time of a heating mode so that lubricating oil staying in an evaporator is discharged. Therefore, lubricating oil is sufficiently returned to the compressor even when the heating mode is switched from a cooling mode.

16 Claims, 12 Drawing Sheets

| MODE | FOUR-WAY VALVE 23 | ELECTRO. VALVE 28a | ELECTRO. VALVE 28b |
|---|---|---|---|
| COOLING | COOLING POSITION | CLOSE | OPEN |
| HEATING | HEATING POSITION | OPEN | CLOSE |
| DEHUMIDIFYING | HEATING POSITION | OPEN/CLOSE | OPEN |
| OIL-DISCHARGING | HEATING POSITION | OPEN | OPEN |

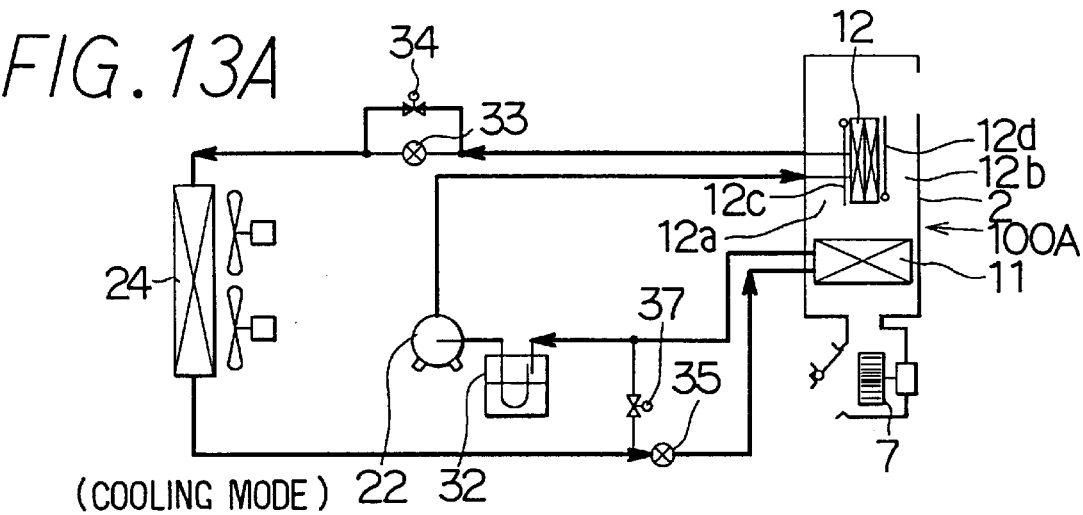
FIG. 13A (COOLING MODE)
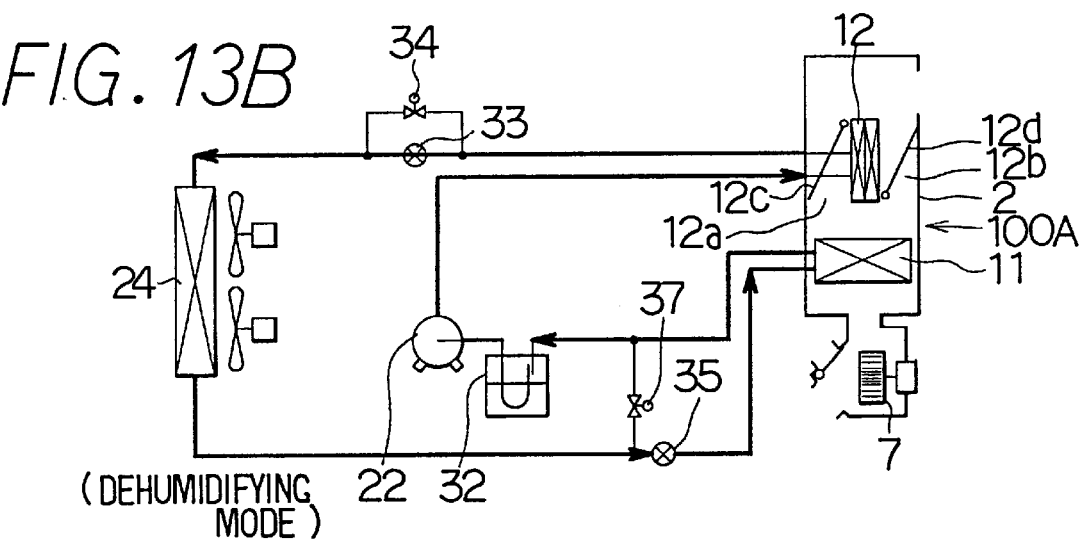
FIG. 13B (DEHUMIDIFYING MODE)
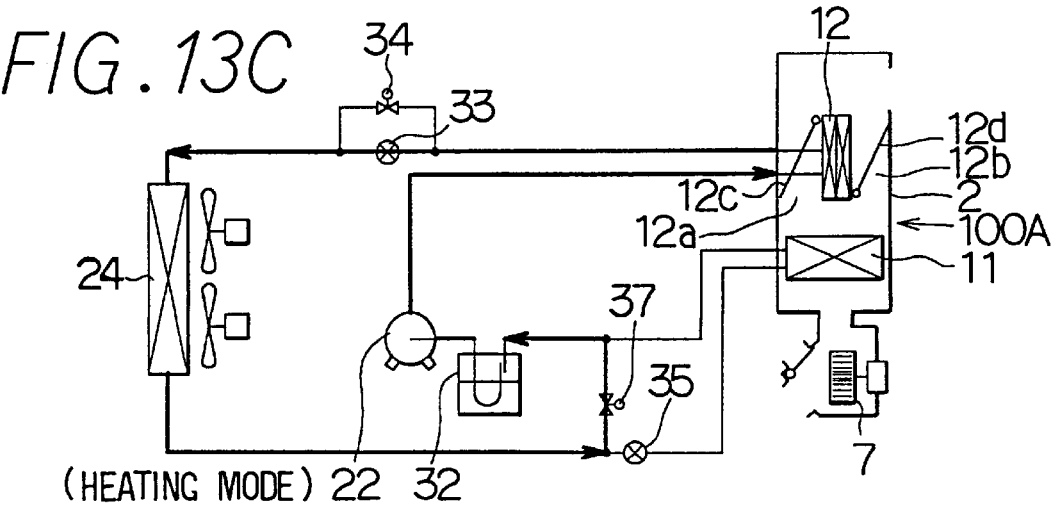
FIG. 13C (HEATING MODE)

REFRIGERANT CYCLE SYSTEM

CROSS-REFERENCE TO RELATED APPLICATION

This application relates to and claims priority from Japanese Patent Applications No. Hei. 9-326631 filed on Nov. 27, 1997, and No. Hei. 9-328998 filed on Nov. 28, 1997, the contents of which are hereby incorporated by reference.

BACKGROUND OF THE INVENTION

1. Field of the Invention

The present invention relates to a refrigerant cycle system having a gas-injection function for injecting gas refrigerant from a gas-liquid separator to a compressor. The refrigerant cycle system is suitable for an air conditioning apparatus for a vehicle such as a hybrid vehicle and an electrical vehicle.

2. Related Art

JP-A-9-39550 discloses a conventional refrigerant cycle having a gas-injection function. In the conventional refrigerant cycle for an air conditioning apparatus of a vehicle, lubricating oil is supplied to the compressor so that a sliding portion of the compressor moves smoothly. Lubricating oil is dissolved in liquid refrigerant and circulates through the refrigerant cycle along with liquid refrigerant. In a gas refrigerant area of the refrigerant cycle, lubricating oil circulates through the refrigerant cycle while being washed away by gas refrigerant along an inner wall of a refrigerant pipe. That is, during a heating mode of the air conditioning apparatus, lubricating oil dissolved in liquid refrigerant from a gas-liquid separator passes through a low-pressure expansion valve, and flows into an exterior heat exchanger along with the refrigerant flow. The lubricating oil from the exterior heat exchanger is returned to the compressor while being washed away by gas refrigerant along the inner wall of the refrigerant pipe. During a cooling mode, lubricating oil dissolved in liquid refrigerant from the gas-liquid separator passes through the low-pressure expansion valve, and flows into an interior cooling heat exchanger along with the refrigerant flow. The lubricating oil from the interior cooling heat exchanger is returned to the compressor while being washed away by gas refrigerant along the inner wall of the refrigerant pipe.

However, when the air conditioning apparatus is used in the heating mode while outside air has an extremely low temperature such as −20° C., an evaporation temperature of refrigerant in the exterior heat exchanger becomes lower than −30° C. due to decrease in the opening degree of the low-pressure expansion valve. As a result, viscosity of lubricating oil in the refrigerant cycle becomes extremely high, resulting in adhesion of lubricating oil to the inner wall of the refrigerant pipe. That is, when the refrigerant cycle is used at the extremely low temperature of outside air, lubricating oil hardly flows from the exterior heat exchanger to the compressor, resulting in shortage of lubricating oil in the compressor.

Further, when a rotation speed of the compressor is electrically controlled by an inverter and the compressor is driven at a low rotation speed, quantity of refrigerant circulating in the refrigerant cycle is decreased. Therefore, lubricating oil tends to stay inside units of the refrigerant cycle having a relatively large capacity, such as the heat exchangers. As a result, lubricating oil returning to the compressor becomes insufficient, thereby deteriorating durability of the compressor.

JP-A-3-260556 discloses a refrigerant cycle with a gas-injection function, in which not only gas refrigerant but also liquid refrigerant is introduced from a gas-liquid separator to a compressor through a gas-injection passage. Therefore, cooling performance of the compressor is improved, and a temperature of a compressor is prevented from excessively rasing. In the refrigerant cycle, the gas-liquid separator has a gas-suction pipe connected to the gas-injection passage of the compressor and a liquid-suction pipe. A middle pipe portion of the gas-suction pipe is immersed in liquid-refrigerant within the gas-liquid separator, while an open end of the gas-suction pipe is positioned in gas refrigerant within the gas-liquid separator. Further, the middle pipe portion of the gas-suction pipe immersed in the liquid-refrigerant has a suction hole for sucking liquid refrigerant. Therefore, both gas and liquid refrigerant in the gas-liquid separator can be introduced into the compressor through the gas-injection passage.

However, JP-A-3-260556 does not disclose the relationship between a position of the suction hole of the gas-suction pipe and a position of an open end of the liquid-suction pipe for introducing liquid refrigerant into a low-pressure expansion valve, although the suction hole of the gas-suction pipe and the open end of the liquid-suction pipe are indicated at substantially the same height in an accompanying drawing. A height of a surface of liquid refrigerant in the gas-liquid separator changes greatly as a heat load of the refrigerant cycle changes. Therefore, liquid refrigerant may not be sucked into the gas-suction pipe from the suction hole.

This may also cause shortage of lubricating oil in the compressor.

On the other hand, each of JP-A-9-39550, JP-A-9-86149 and U.S. Pat. No. 5,669,231 discloses a refrigerant cycle of an air conditioning apparatus for a vehicle such as an electrical vehicle, having a heat-pump system. In each of the conventional refrigerant cycles, an evaporator for cooling air and a condenser for heating air are separately disposed in the passenger compartment. Air is cooled by the evaporator and then heated by the condenser for dehumidifying and heating air to be blown into the passenger compartment. Further, because the evaporator and the condenser are separately disposed, rapid evaporation of condensed water does not occur even when the air conditioning apparatus switches from a cooling mode to a heating mode. However, when the air conditioning apparatus is operated in the cooling mode during the spring or the fall, the compressor rotates at a low rotation speed to suppress cooling performance of the air conditioning apparatus, because a cooling load for the passenger compartment is relatively small during the spring or the fall. As a result, liquid refrigerant in which lubricating oil is dissolved may stay in the evaporator. When the air conditioning apparatus is switched from the cooling mode to the heating mode, the refrigerant of refrigerant cycle does not flow into the evaporator. Therefore, liquid refrigerant staying in the evaporator is hardly discharged from the evaporator and continues to stay in the evaporator in the heating mode. As a result, lubricating oil is insufficiently returned to the compressor, and durability of the compressor is decreased.

SUMMARY OF THE INVENTION

In view of the foregoing problems, it is a first object of the present invention to provide a refrigerant cycle system having a gas-injection function, in which liquid refrigerant is constantly introduced into a compressor regardless of a heat load of the refrigerant cycle, so that lubricating oil is sufficiently supplied to the compressor.

It is a second object of the present invention to provide a refrigerant cycle system for an air conditioning apparatus of a vehicle, in which lubricating oil is sufficiently supplied to a compressor even when the air conditioning apparatus is switched from a cooling mode to a heating mode.

It is a third object of the present invention to provide a refrigerant cycle system for an air conditioning apparatus of a vehicle, in which lubricating oil staying in a cooling heat exchanger is discharged while a sufficient heating performance for a passenger compartment is maintained.

According to the present invention, a refrigerant cycle system having a gas-injection function includes a gas-liquid separator and a compressor. The gas-liquid separator has a gas-suction pipe for introducing gas refrigerant in the gas-liquid separator into the compressor, and a liquid-suction pipe for introducing liquid refrigerant in the gas-liquid separator into an expansion valve. The gas-suction pipe has a suction hole for sucking liquid refrigerant in the gas-liquid separator into the gas-suction pipe to be introduced into the compressor. The suction hole is provided in a middle pipe portion of the gas-suction pipe, immersed in liquid refrigerant, at a position lower than an open end of the liquid-suction pipe. A height of a surface of liquid refrigerant within the gas-liquid separator is maintained to be equal to or higher than the open end of the liquid-suction pipe regardless of change in a heating load of the refrigerant cycle. Therefore, liquid refrigerant in which lubricating oil is dissolved is constantly sucked into the gas-suction pipe from the suction hole. Thus, lubricating oil is sufficiently supplied to the compressor, and durability of the compressor is improved.

Further, the refrigerant cycle system includes a control unit for setting a cooling mode, a heating mode and a dehumidifying mode. The control unit has determining means for determining whether or not an oil-discharging operation for discharging lubricating oil staying in a cooling heat exchanger into the compressor is necessary at a starting time of the heating mode, oil-discharging operation setting means for setting the oil-discharging operation when the determining means determines that the oil-discharging operation is necessary, and heating mode setting means for setting the heating mode after the oil-discharging operation is performed for a predetermined period when the determining means determines that the oil-discharging operation is necessary. Accordingly, when the oil-discharging operation setting means sets the oil discharging operation, liquid refrigerant including lubricating oil, staying in the cooling heat exchanger, is discharged from the cooling heat exchanger. Thus, lubricating oil is sufficiently supplied to the compressor even when the air conditioning apparatus is switched from the cooling mode to the heating mode. Further, in the oil-discharging mode, refrigerant flows through both the external heat exchanger and the cooling heat exchanger. Therefore, an amount of heat absorbed by refrigerant flowing through the cooling heat exchanger is suppressed, thereby preventing heating performance for the passenger compartment from being decreased at the starting time of the heating mode. Thus, lubricating oil staying in the cooling heat exchanger can be discharged, while a sufficient heating performance for the passenger compartment is maintained in the air conditioning apparatus.

Preferably, the control unit sets the dehumidifying mode when the determining means determines that the oil-discharging operation is necessary. Therefore, the oil-discharging operation is readily set.

BRIEF DESCRIPTION OF THE DRAWINGS

Additional objects and advantages of the present invention will be more readily apparent from the following detailed description of preferred embodiments when taken together with the accompanying drawings, in which:

FIGS. 13A, 13B, 13C are schematic diagrams respectively showing the ventilation system and the refrigerant cycle of the air conditioning apparatus in a cooling mode, a dehumidifying mode, and a heating mode, according to the fourth embodiment;

DETAILED DESCRIPTION OF THE PREFERRED EMBODIMENTS

Preferred embodiments of the present invention will be described hereinafter with reference to the accompanying drawings.

Figure 1:
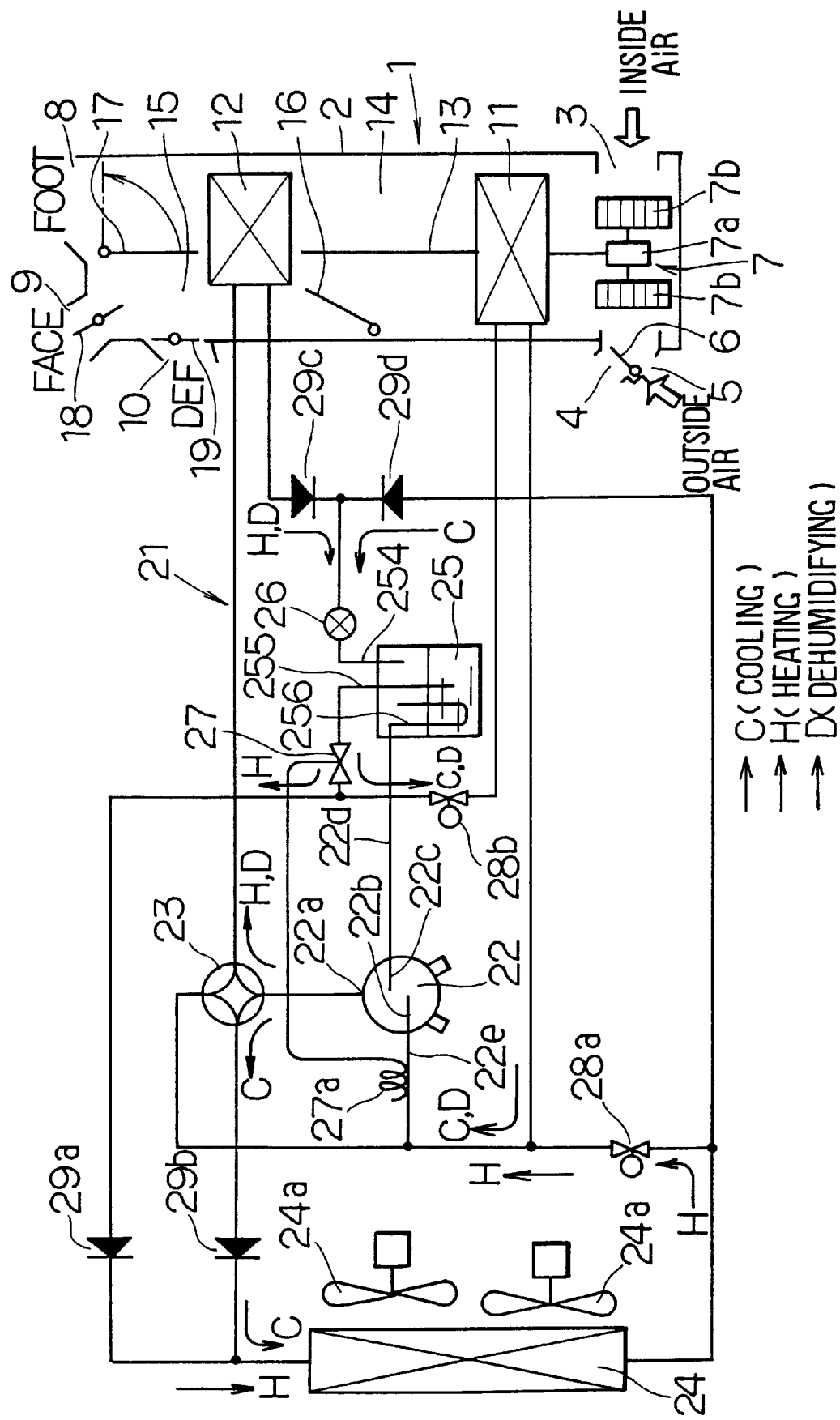
FIG. 1 is a schematic diagram showing a ventilation system and a refrigerant cycle of an air conditioning apparatus for a vehicle according to a first preferred embodiment of the present invention.
Figure 2:
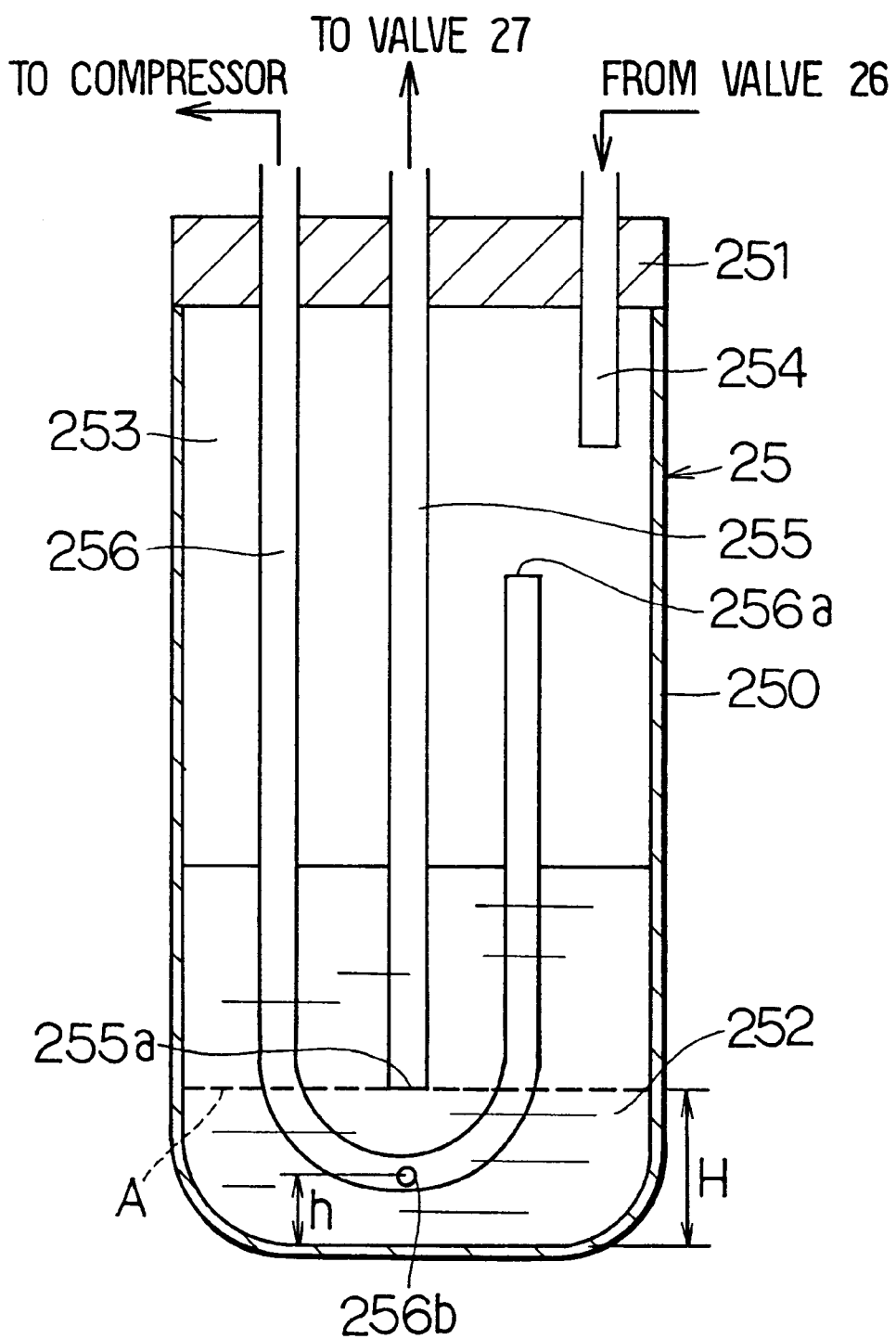
FIG. 2 is a schematic sectional view showing a gas-liquid separator of the refrigerant cycle according to the first embodiment.

A first preferred embodiment of the present invention will be now described with reference to FIGS. 1, 2. In the first embodiment, an air conditioning apparatus is applied to an electric vehicle. As shown in FIG. 1, the air conditioning apparatus includes a ventilation system 1 and a refrigerant cycle 21. The ventilation system 1 is generally disposed inside a passenger compartment of the vehicle, and has an air duct 2 which forms an air passage for leading air toward the passenger compartment. The air duct 2 has inside air inlets 3, 4 for introducing therein inside air (i.e., air inside the passenger compartment) and an outside air inlet 5 for introducing therein outside air (i.e., air outside the passenger compartment) at one end side of the air duct 2. The air inlets 4, 5 are opened and closed by an inside/outside air switching door 6.

A blower 7 for blowing air into the passenger compartment is disposed in the air duct 2 adjacent to the air inlets 3–5. The blower 7 has a motor 7a and a centrifugal fan 7b activated by the motor 7a. At the other end side of the air duct 2, there are formed a foot air outlet 8 through which air is blown toward the foot portion of a passenger in the passenger compartment, a face air outlet 9 through which air is blown toward the upper portion of the passenger, and a defroster air outlet 10 through which air is blown toward an inner surface of a windshield of the vehicle.

An interior cooling heat exchanger 11 constituting a part of the refrigerant cycle 21 is disposed within the air duct 2 at a downstream air side of the blower 7. During a cooling mode or a dehumidifying mode of the air conditioning apparatus, the interior cooling heat exchanger 11 operates as an evaporator in which refrigerant absorbs heat from air in the air duct 2 so that air is dehumidified and is cooled. During a heating mode of the air conditioning apparatus, refrigerant does not flow through the interior cooling heat exchanger 11.

Further, an interior heating heat exchanger 12 is disposed within the air duct 2 at a downstream air side of the interior cooling heat exchanger 11. The interior heating heat exchanger 12 also constitutes a part of the refrigerant cycle 21. During the heating mode or the dehumidifying mode of the air conditioning apparatus, the interior heating heat exchanger 12 operates as a condenser in which refrigerant is condensed so that air in the air duct 2 is heated by latent heat of the condensation. During the cooling mode of the air conditioning apparatus, no refrigerant flows through the interior heating heat exchanger 12.

The air passage of the air duct 2 is partitioned by a partition wall 13 into a first air passage 14 on a side of the foot air outlet 8 and a second air passage 15 on a side of the face air outlet 9 and the defroster air outlet 10. A door 16 opens and closes the second air passage 15. A foot door 17 opens and closes the foot air outlet 8, and functions as a partition member for partitioning the air passage at a downstream air side of the interior heating heat exchanger 12 into the first and second air passages 14, 15 while fully opening the foot air outlet 8. A face door 18 opens and closes the face air outlet 9, and a defroster door 19 opens and closes the defroster air outlet 10.

The refrigerant cycle 21 having the interior cooling heat exchanger 11 and the interior heating heat exchanger 12 is a heat-pump type refrigerant cycle for cooling and heating air blown into the passenger compartment. The refrigerant cycle 21 further includes a compressor 22 which sucks, compresses and discharges refrigerant, an electromagnetic four-way valve 23 for switching a flow direction of refrigerant, an exterior heat exchanger 24 disposed outside the passenger compartment, a gas-liquid separator 25 which separates gas-liquid two-phase refrigerant into gas refrigerant and liquid refrigerant and stores liquid refrigerant therein, an electrical expansion valve (i.e., high-pressure side decompressing unit) 26, a thermal expansion valve (i.e., low-pressure side decompressing unit) 27, electromagnetic valves 28a, 28b, and check valves 29a, 29b, 29c, 29d. The electrical expansion valve 26 decompresses refrigerant flowing at a high-pressure side in the refrigerant cycle 21 to a middle pressure (e.g., 4–15 kg/cm$^2$). The thermal expansion valve 27 decompresses middle-pressure liquid refrigerant from the gas-liquid separator 25 to a low-pressure.

The compressor 22 is an electrical compressor and is driven by an electrical motor (not shown). The electrical motor is disposed integrally with the compressor 22 within a sealed case. A rotation speed of the electrical motor of the compressor is continuously controlled and changed by an inverter (not shown). The compressor 22 has an outlet port 22a through which compressed refrigerant is discharged, an inlet port 22b through which refrigerant from a low-pressure side of the refrigerant cycle 21 is introduced, and a gas-injection port 22c through which gas refrigerant separated from gas-liquid refrigerant in the gas-liquid separator 25 is injected into the compressor 22. The gas-injection port 22c communicates with a gas-suction pipe 256 of the gas-liquid separator 25 through a gas-injection passage 22d. Gas refrigerant in the gas-liquid separator 25 is sucked by the gas-suction pipe 256 to be introduced into the compressor 22.

Further, a suction passage 22e is connected to the inlet port 22b of the compressor 22. A temperature detecting cylinder (temperature sensor) 27a of the thermal expansion valve 27 is disposed in the suction passage 22e. An opening degree of the thermal expansion valve 27 is adjusted so that a super-heating degree of refrigerant within the suction passage 22e is set to a predetermined value.

The exterior heat exchanger 24 is disposed outside the passenger compartment to perform heat-exchange between outside air blown by an electrical outside fan 24a disposed outside the passenger compartment and refrigerant flowing through the exterior heat exchanger 24. An opening degree of the electrical expansion valve 26 is electrically controlled using a control unit (not shown).

Next, the gas-liquid separator 25 which is a main portion of the first embodiment will be described in detail with reference to FIG. 2. The gas-liquid separator 25 has a metallic case 250 formed in a substantial cylinder shape, and a lid 251 for closing an upper opened end of the case 250. A liquid refrigerant area 252 consisting of surplus liquid refrigerant of the refrigerant cycle 21 is formed in a lower part of the case 250, and a gas refrigerant area 253 is formed in an upper part of the case 250. That is, the gas refrigerant area 253 consisting of gas refrigerant is formed in the case 250 at a direct upper side of the liquid refrigerant area 252.

An inlet pipe 254, a liquid-suction pipe 255 and a gas-suction pipe 256, each of which generally has a round cross-section, are inserted into the lid 251. Through the inlet pipe 254, middle-pressure gas-liquid two-phase refrigerant decompressed by the electrical expansion valve 26 is introduced into the gas-liquid separator 25. One end of the inlet pipe 254 is opened in an upper side portion of the gas refrigerant area 253, as shown in FIG. 2. The liquid-suction pipe (i.e., outlet pipe) 255 is for sucking liquid refrigerant in the gas-liquid separator 25. The liquid-suction pipe 255 has an open end 255a formed at one end (i.e., lower end) thereof. The open end 255a is normally located in the liquid-refrigerant area 252, adjacent to a bottom of the gas-liquid separator 25.

Further, the gas-suction pipe (i.e., outlet pipe) 256 is for introducing gas refrigerant in the gas-liquid separator 25 into the gas-injection passage 22d. The gas-suction pipe 256 is a U-shaped pipe, and has an open end 256a formed at one end of the U-shaped pipe. The open end 256a is opened in the gas-refrigerant area 253 to suck gas refrigerant into the gas-suction pipe 256. A middle pipe portion of the U-shaped gas-suction pipe 256 hangs down to be positioned below the open end 255a of the liquid-suction pipe 255, and is immersed in the liquid-refrigerant area 252. A suction hole 256b for sucking liquid refrigerant into the gas-suction pipe 256 is formed at the lowest part of the middle pipe portion of the U-shaped gas-suction pipe 256 immersed in the liquid-refrigerant area 252. Thus, the suction hole 256b is provided in the middle pipe portion at a position below the open end 255a of the liquid suction pipe 255. In the first embodiment of the present invention, when the opening area of the open end 256a is 28 mm$^2$, the opening area of the suction hole 256b is 3 mm$^2$, for example. A height h from the bottom of the gas-liquid separator 25 to the suction hole 256b of the gas suction pipe 256 is 7 mm, and a height H from the bottom of the gas-liquid separator 25 to the open end 255a of the liquid-suction pipe 255 is 14 mm, for example.

Next, operation of the refrigerant cycle 21 according to the first embodiment will be described with reference to FIG. 1. When the heating mode is set in the air conditioning apparatus, high-temperature high-pressure gas refrigerant discharged from the compressor 22 flows into the interior heating heat exchanger 12 through the four-way valve 23, as indicated by arrow H in FIG. 1. The interior heating heat exchanger 12 performs heat-exchange between gas-refrigerant flowing therethrough and air blown by the blower 7 so that gas-refrigerant is condensed and liquified to heat air. The heated air is blown into the passenger compartment. High-pressure liquid refrigerant from the interior heating heat exchanger 12 flows into the electrical expansion valve 26 through the check valve 29c, and decompressed to middle-pressure gas-liquid two-phase refrigerant by the electrical expansion valve 26. The middle-pressure gas-liquid two-phase refrigerant from the electrical expansion valve 26 is introduced into the gas-liquid separator 25 through the inlet pipe 254. In the gas-liquid separator 25, the middle-pressure gas-liquid refrigerant is separated into gas refrigerant forming the gas-refrigerant area 253 in the upper part of the gas-liquid separator 25, and liquid refrigerant forming the liquid-refrigerant area 252 in the lower part of the gas-liquid separator 25. Liquid refrigerant in the gas-liquid separator 25 is sucked by the liquid-suction pipe 255 and is introduced into the thermal expansion valve 27 to be decompressed to a low-pressure gas-liquid two-phase refrigerant. Further, the low-pressure gas-liquid two-phase refrigerant from the thermal expansion valve 27 flows into the exterior heat exchanger 24 through the check valve 29a. The exterior heat exchanger 24 performs heat exchange between liquid refrigerant flowing therethrough and outside air so that the liquid refrigerant is evaporated in the exterior heat exchanger 24. The gas refrigerant from the exterior heat exchanger 24 passes through the electromagnetic valve 28a and the suction passage 22e, and is sucked into the compressor 22 from the suction port 22b.

On the other hand, the gas-refrigerant in the gas-refrigerant area 253 of the gas-liquid separator 25 is sucked into the gas-suction pipe 256 from the open end 256a of the gas-suction pipe 256, and is introduced into the gas-injection passage 22d. At this time, a little amount of liquid refrigerant is also sucked into the gas-suction pipe 256 from the suction hole 256b, and is also introduced into the gas-injection passage 22d. The gas refrigerant and liquid refrigerant from the gas-liquid separator 25 flows through the gas-injection passage 22d, and is introduced into the compressor 22 at a compression-intermediate state from the gas-injection port 22c. Because the middle-pressure gas refrigerant in the gas-liquid separator 25 is introduced into a compression-intermediate state of the compressor 22, enthalpy of the exterior heat exchanger 24 is increased by $\Delta i$ while quantity of heat absorbed by refrigerant in the exterior heat exchanger 24 is increased, and quantity of refrigerant circulating in the refrigerant cycle 21 is also increased. As a result, heating performance of the air conditioning apparatus is improved.

When an outside air temperature (Tam) is extremely low (e.g., Tam $\leq$ –20° C.) during the winter, an evaporation temperature of refrigerant in the exterior heat exchanger 24 becomes lower than –30° C., and viscosity of lubricating oil is greatly increased in the exterior heat exchanger 24. Therefore, lubricating oil may adhere to an inner wall of an outlet pipe of the exterior heat exchanger 24, resulting in shortage of lubricating oil returning to the compressor 22. Further, the rotation speed of the compressor 22 is electrically controlled by the inverter. Therefore, when the compressor 22 is driven at a low rotation speed, quantity of circulating refrigerant is decreased. As a result, liquid refrigerant including lubricating oil stays inside the heat exchangers 12, 24 which have a relatively large capacity, resulting in shortage of lubricating oil returning to the compressor 22.

However, according to the first embodiment of the present invention, liquid refrigerant is sucked into the gas-suction pipe 256 of the gas-liquid separator 25 from the suction hole 256b formed in the gas-suction pipe 256, and is introduced into the compressor 22 from the gas-injection port 22c along with gas refrigerant. Therefore, lubricating oil dissolved in the liquid refrigerant is sufficiently returned to the compressor 22, even when the compressor 22 is operated at a low rotation speed or at an extremely low temperature during the winter.

Further, according to the first embodiment, the suction hole 256b of the gas-suction pipe 256 is provided below the open end 255a of the liquid-suction pipe 255. A height of a surface of liquid refrigerant stored in the gas-liquid separator 25 greatly changes as various operation conditions of the refrigerant cycle 21 change. That is, when a heating load of the refrigerant cycle 21 is high, the compressor 22 is driven at a high rotation speed so that the interior heating heat exchanger 12 disposed at an upstream refrigerant side of the compressor 22 operates with the maximum capacity. As a result, quantity of refrigerant circulating in the refrigerant cycle 21 is increased; and therefore, refrigerant condensed by the interior heating heat exchanger 12 is discharged from the interior heating heat exchanger 12, and flows into the gas-liquid separator 25. Thus, the height of the surface of the liquid refrigerant in the gas-liquid separator 25 is prevented from extremely decreasing.

However, when the heating load of the refrigerant cycle 21 is low, the interior heating heat exchanger 12 is not operated with the maximum capacity. Therefore, the compressor 22 is driven at a low rotation speed, and liquid refrigerant condensed by the interior heating heat exchanger 12 tends to stay in the interior heating heat exchanger 12. Further, quantity of refrigerant circulating in the refrigerant cycle 21 is decreased due to the low rotation speed of the compressor 22. Therefore, refrigerant staying inside the interior heating heat exchanger 12 is hardly discharged from the interior heating heat exchanger 12, and continues to stay inside the interior heating heat exchanger 12. Thus, the height of the surface of liquid refrigerant stored in the gas-liquid separator 25 may be extremely decreased.

When the surface of the liquid refrigerant stored in the gas-liquid separator 25 becomes lower than the open end 255a of the liquid-suction pipe 255, the liquid-suction pipe 255 sucks gas refrigerant so that gas refrigerant is introduced into the thermal expansion valve 27. Therefore, a super-heating degree of refrigerant sucked into the compressor 22 is increased. In this case, the opening degree of the thermal expansion valve 27 is increased so that quantity of refrigerant circulating in the refrigerant cycle 21 is increased. As a result, liquid refrigerant staying in the interior heating heat exchanger 12 is discharged from the interior heating heat exchanger 12, and flows into the gas-liquid separator 25. Thus, in the first embodiment, the surface of liquid refrigerant in the gas-liquid separator 25 can be constantly set to be equal to or higher than the open end 255a of the liquid-suction pipe 255, that is, higher than broken line A shown in FIG. 2.

According to the first embodiment, the suction hole 256b of the gas-suction pipe 256, for introducing liquid refrigerant into the gas-suction pipe 256, is provided at a position lower than the open end 255a of the liquid-suction pipe 255. Therefore, even if the height of the surface of liquid refrigerant stored in the gas-liquid separator 25 changes as the heat load of the refrigerant cycle 21 changes, the suction hole 256b is constantly immersed in liquid refrigerant. As a result, liquid refrigerant in which lubricating oil is dissolved is constantly introduced into the gas-suction pipe 256 from the suction hole 256b, and is introduced into the compressor 22 through the gas-injection passage 22d. Thus, a sufficient lubricating oil can be supplied to the compressor 22, and the compressor 22 can be operated with a sufficient lubricating performance.

When the cooling mode is set in the air conditioning apparatus, high-pressure high-temperature gas refrigerant discharged from the compressor 22 flows into the exterior heat exchanger 24 through the four-way valve 23 and the check valve 29b as indicated by arrow C in FIG. 1, and is cooled and condensed in the exterior heat exchanger 24. High-pressure liquid refrigerant discharged from the exterior heat exchanger 24 flows through the check valve 29d, and is decompressed by the electrical expansion valve 26 to middle-pressure gas-liquid two-phase refrigerant. The gas-liquid two-phase refrigerant discharged from the electrical expansion valve 26 flows into the gas-liquid separator 25, and is separated into gas refrigerant and liquid refrigerant in the gas-liquid separator 25. The separated liquid refrigerant in the gas-liquid separator 25 is introduced into the thermal expansion valve 27 through the liquid-suction pipe 255, and is decompressed to low-pressure liquid refrigerant. The low-pressure liquid refrigerant from the thermal expansion valve 27 passes through the electromagnetic valve 28b, and flows into the interior cooling heat exchanger 11. In the interior cooling heat exchanger 11, liquid refrigerant evaporates by absorbing heat from air blown by the blower 7 so that air is cooled. The evaporated gas refrigerant flows through the suction passage 22e, and is sucked into the compressor 22 from the inlet port 22b.

On the other hand, the gas refrigerant separated by the gas-liquid separator 25 is sucked into the gas-suction pipe 256 from the open end 256a, and is introduced into the gas-injection passage 22d. At this time, a little amount of liquid refrigerant is also sucked into the gas-suction pipe 256 from the suction hole 256b, and is also introduced into the gas-injection passage 22d. The gas refrigerant containing a little amount of liquid refrigerant passes through the gas-injection passage 22d, and is introduced into the compressor 22 from the gas-injection port 22c at the compression-intermediate state. Thus, even in the cooling mode, the gas-suction pipe 256 sucks both gas refrigerant and liquid refrigerant in the gas-liquid separator 25 in the same way as that in the heating mode.

When the dehumidifying mode is set in the air conditioning apparatus, high-pressure high-temperature gas refrigerant discharged from the compressor 22 flows into the interior heating heat exchanger 12 through the four-way valve 23 as indicated by arrow D in FIG. 1. The interior heating heat exchanger 12 performs heat-exchange between the gas refrigerant and air blown by the blower 7 so that the gas refrigerant is condensed. The condensed refrigerant discharged from the interior heating heat exchanger 12 passes through the check valve 29c, and is decompressed by the electrical expansion valve 26 to middle-pressure gas-liquid two-phase refrigerant. The middle-pressure gas-liquid refrigerant flows into the gas-liquid separator 25, and is separated into gas refrigerant and liquid refrigerant. The separated gas refrigerant in the gas-liquid separator 25 is sucked into the gas-suction pipe 256 from the open end 256a of the gas-suction pipe 256, and is introduced into the gas-injection passage 22d. At this time, a little amount of liquid refrigerant is also sucked into the gas-suction pipe 256 from the suction hole 256b, and is also introduced into the gas-injection passage 22d. The gas refrigerant containing a little amount of liquid refrigerant passes through the gas-injection passage 22d, and is introduced into the compressor 22 from the gas-injection port 22c at the compression intermediate state of the compressor 22.

On the other hand, the liquid refrigerant in the gas-liquid separator 25 is discharged from the gas-liquid separator 25 through the liquid-suction pipe 255, and is decompressed by the thermal expansion valve 27. The decompressed refrigerant from the thermal expansion valve 27 passes through the opened electromagnetic valve 28b, and flows into the interior cooling heat exchanger 11. In the interior cooling heat exchanger 11, refrigerant is evaporated by absorbing heat from air blown by the blower 7. Since the electromagnetic valve 28a is closed during the dehumidifying mode, gas refrigerant discharged from the interior cooling heat exchanger 11 does not flow into the exterior heat exchanger 24, but flows into the compressor 22. In the dehumidifying mode, refrigerant flows into both the interior cooling heat exchanger 11 and the interior heating heat exchanger 12, both of which are disposed inside the ventilation system 1. Thus, during the dehumidifying mode, air blown by the blower 7 is cooled and dehumidified by the interior cooling heat exchanger 11 firstly, and then is heated in the interior heating heat exchanger 12.

Figure 3:
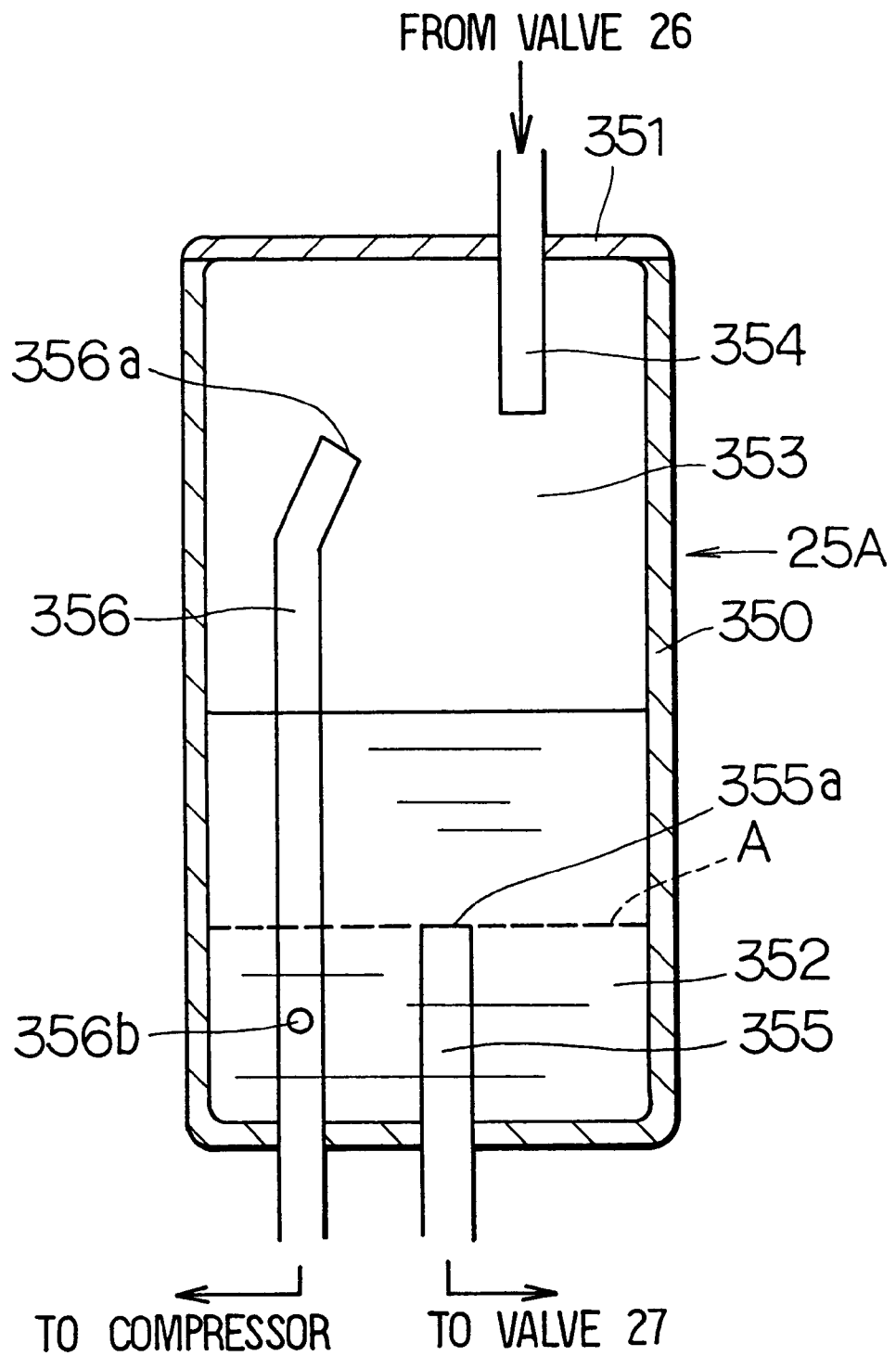
FIG. 3 is a schematic sectional view showing a gas-liquid separator of a refrigerant cycle according to a second preferred embodiment of the present invention.

A second preferred embodiment of the present invention will be described with reference to FIG. 3. In this and following embodiments, components which are similar to those in the first embodiment are indicated with the same reference numerals, and the explanation thereof is omitted.

In the above-described first embodiment, the gas-suction pipe 256 is formed in a U-shape, and has the suction hole 256b at the lowest part of the middle pipe portion of the gas-suction pipe 256, immersed in liquid refrigerant. However, in the second embodiment, as shown in FIG. 3, a gas-suction pipe 356 for sucking gas refrigerant in a gas-liquid separator 25A is formed substantially straight, and is inserted into a case 350 of the gas-liquid separator 25A from the bottom of the case 350. The case 350 is closed by a lid 351 to form a sealed space. An open end 356a of the gas-suction pipe 356 formed at an upper end thereof is opened in a gas-refrigerant area 353 of the gas-liquid separator 25A. Further, a liquid-suction pipe 355 for sucking liquid refrigerant in the gas-liquid separator 25A is also inserted into the case 350 of the gas-liquid separator 25A from the bottom of the case 350. An open end 355a of the liquid-suction pipe 355 is formed at an upper end thereof, and is opened in a liquid-refrigerant area 352 of the gas-liquid separator 25A. Further, the gas-suction pipe 356 has a suction hole 356b for sucking liquid refrigerant, and the suction hole 356b is provided at a position lower than the open end 355a of the liquid-suction pipe 355. In the gas-liquid separator 25A of the second embodiment, the other portions are similar to those in the first embodiment.

According to the second embodiment, a sufficient lubricating oil can be supplied to the compressor 22 even if a heat load of the refrigerant cycle 21 fluctuates, similarly to the first embodiment.

Figure 4:
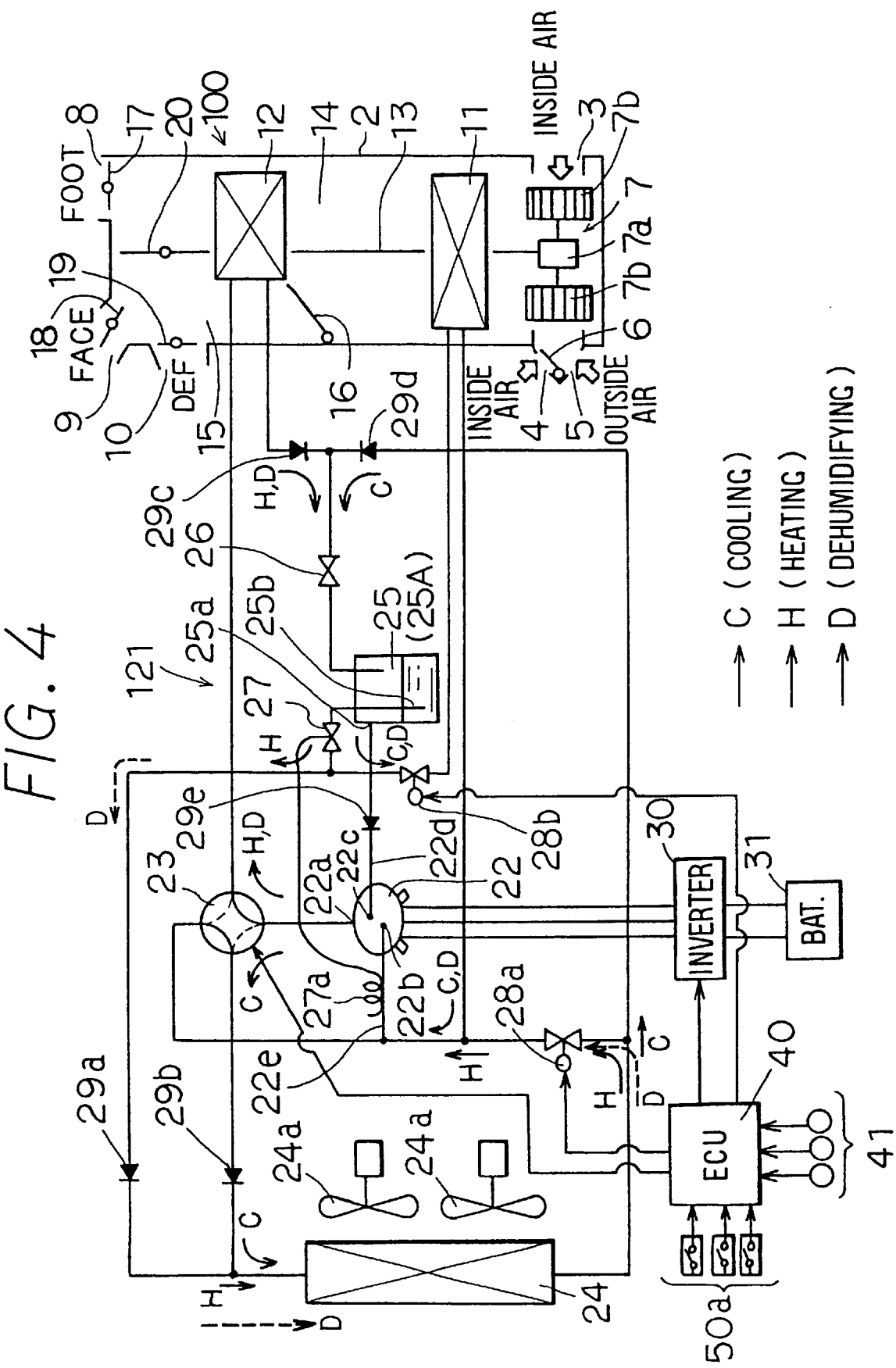
FIG. 4 is a schematic diagram showing a ventilation system and a refrigerant cycle of an air conditioning apparats for a vehicle according to a third preferred embodiment of the present invention.

A third preferred embodiment of the present invention will be described with reference to FIGS. 4–11. In the third embodiment, the air conditioning apparatus is applied to an electrical vehicle, for example. As shown in FIG. 4, the air conditioning apparatus includes a ventilation system 100 disposed inside the passenger compartment and a refrigerant cycle 121. The ventilation system 100 of the third embodiment is similar to that of the first embodiment. The air passage in the air duct 2 is partitioned by the partition wall 13 into the first air passage 14 on a side of the foot air outlet 8 and the second air passage 15 on a side of the face and defroster air outlets 9, 10. In the third embodiment, a downstream air passage of the interior heating heat exchanger 12 is partitioned by a communication door 20, and the foot air outlet 8, the face air outlet 9 and the defroster air outlet 10 are opened and closed by the doors 17–19, respectively. Accordingly, during the winter, inside air having a high temperature is introduced into the air duct 2 from the inside air inlet 3, flows through the first air passage 14 communicating with the foot air outlet 8, and is blown toward the foot portion of a passenger in the passenger compartment. On the other hand, outside air having a low humidity is introduced into the air duct 2 from the outside air inlet 5, flows through the second air passage 15 communicating with the defroster air outlet 10, and is blown toward the inner surface of the windshield of the vehicle. Thus, heating load of the air conditioning apparatus can be reduced, while defrosting performance of the windshield is improved.

The refrigerant cycle 121 has the interior cooling heat exchanger 11 for cooling air and the interior heating heat exchanger 12 for heating air. That is, the refrigerant cycle 121 functions as a heat-pump refrigerant cycle for cooling and heating air blown into the passenger compartment. The refrigerant cycle 121 further includes the compressor 22, the electromagnetic four-way valve 23 for switching the flow direction of refrigerant, the exterior heat exchanger 24, the gas-liquid separator 25 (25A), the electrical expansion valve (i.e., first decompression unit) 26, the thermal expansion valve (i.e., second decompression unit) 27, the electromagnetic valves 28a, 28b, and the check valves 29a, 29b, 29c, 29d.

The exterior heat exchanger 24 is disposed at an outside of the passenger compartment, and refrigerant in the exterior heat exchanger 24 is heat-exchanged with outside air blown by the outside fan 24a. The compressor 22 is an electrical compressor, and is disposed integrally with an alternating motor (not shown) in a sealed case. The compressor 22 is driven by the alternating motor to suck, compress and discharge refrigerant. An inverter 30 applies alternating current voltage to the alternating motor of the compressor 22. A rotation speed of the alternating motor of the compressor 22 can be continuously changed by adjusting a frequency of the alternating current voltage applied by the inverter 30. Thus, the inverter 30 can adjust the rotation speed of the alternating-motor of the compressor 22. Direct current voltage from a battery 31 mounted on the vehicle is applied to the inverter 30.

The compressor 22 is provided with the outlet port 22a through which refrigerant compressed in the compressor 22 is discharged, the inlet port 22b through which refrigerant from the low-pressure side of the refrigerant cycle 121 is introduced into the compressor 22, and the gas-injection port 22c through which middle-pressure gas refrigerant separated by the gas-liquid separator 25 is introduced into the compressor 22. The gas-injection port 22c communicates with a gas-refrigerant outlet 25a formed at an upper portion of the gas-liquid separator 25, through the gas-injection passage 22d in which the check valve 29e is disposed.

The temperature detecting cylinder 27a of the thermal expansion valve 27 is disposed in the suction passage 22e communicating with the inlet port 22b. The opening degree of the thermal expansion valve 27 is adjusted so that a super-heating degree of refrigerant within the suction passage 22e has a predetermined value. The inverter 30 is electrically controlled by a control unit (ECU) 40. The control unit 40 is consists of a microcomputer and peripheral circuits. The control unit 40 electrically controls the flow direction of refrigerant in the four-way valve 23, and opening and closing operations of the electromagnetic valves 28a, 28b. In the third embodiment, a circulation routine of refrigerant in the refrigerant cycle 121 is changed by the four-way valve 23 and the electromagnetic valves 28a, 28b.

The control unit 40 receives detection signals sent from a sensor group 41. The sensor group 41 includes an outside air temperature sensor for detecting a temperature (Tam) of outside air (i.e., air outside the passenger compartment), an evaporator temperature sensor for detecting a temperature of air blown immediately from the interior cooling heat exchanger 11, a refrigerant pressure sensor for detecting a pressure of refrigerant discharged from the compressor 22 (i.e., the highest pressure of the refrigerant cycle 121). Signals from various levers provided on an air conditioning control panel 50 (FIG. 5) and a switch group 50a are also input to the control unit 40. The air conditioning control panel is disposed adjacent to a driver's seat in the passenger compartment. The doors 6, 16, 17, 18, 19, 20, the blower 7 and the outside fan 24a are also controlled by the control unit 40, although electrical connections therebetween are not indicated in FIG. 4.

Figure 5:
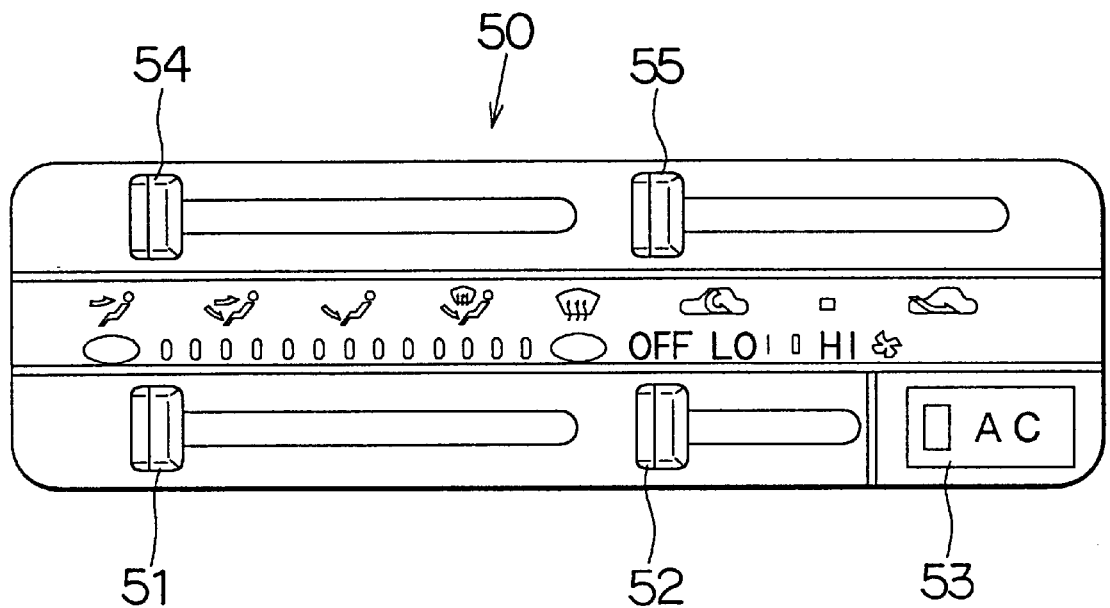
FIG. 5 is a front view showing a control panel for the air conditioning apparatus of the third embodiment.
Figure 6:
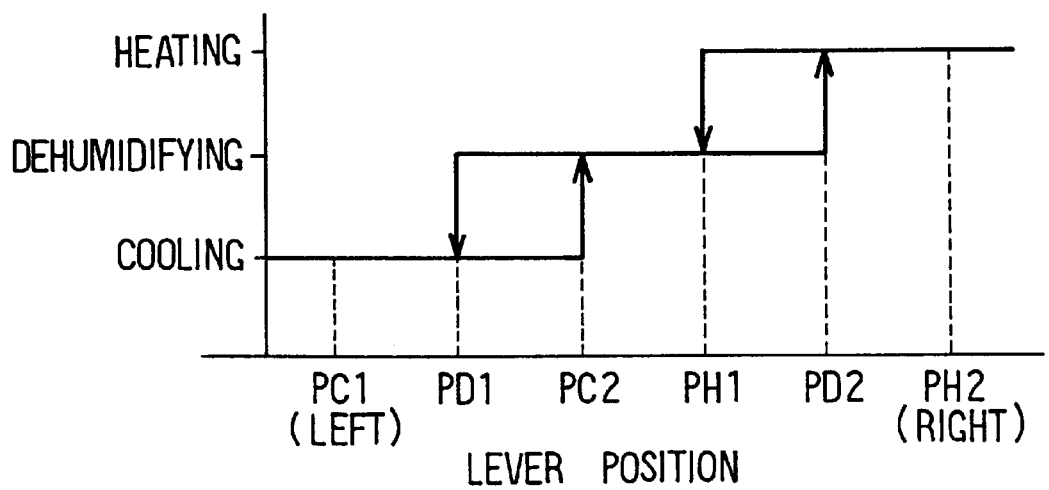
FIG. 6 is a graph showing the relationship between a position of a temperature control lever provided on the control panel, and cooling, heating or dehumidifying mode of the air conditioning apparatus according to the third embodiment.
Figure 7:
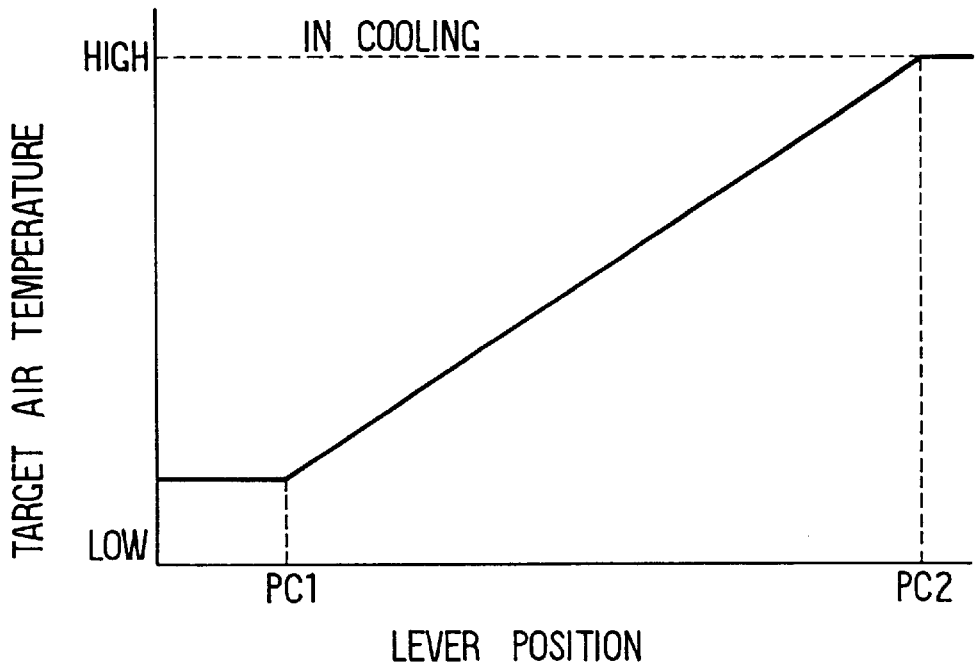
FIG. 7 is a graph showing the relationship between a target temperature of air blown from an interior cooling heat exchanger and a position of the temperature control lever, in the cooling mode, according to the third embodiment.
Figure 8:
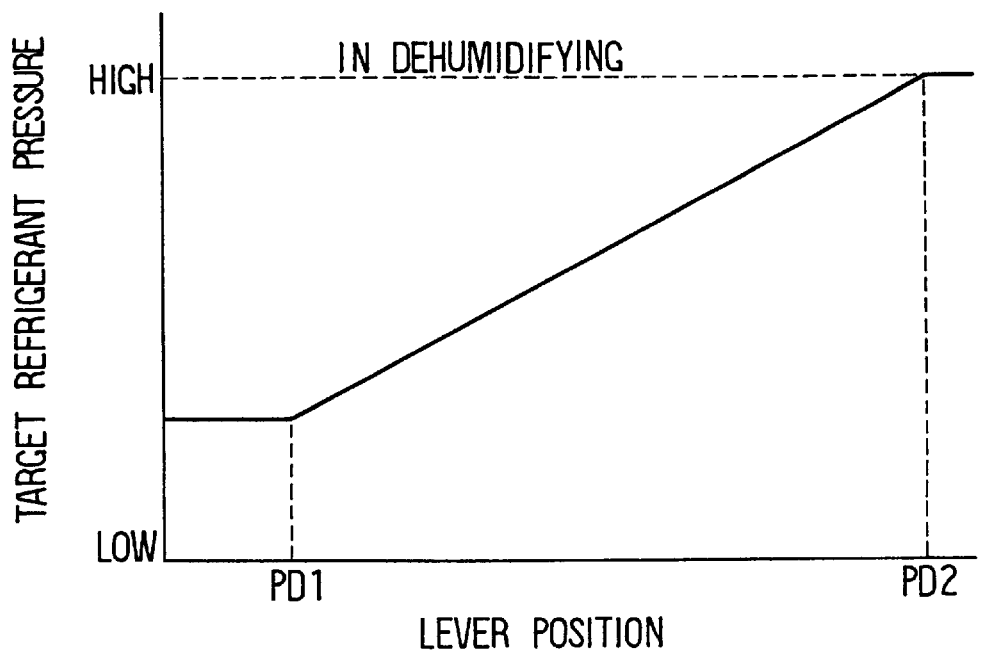
FIG. 8 is a graph showing the relationship between a target pressure of refrigerant discharged from a compressor of the refrigerant cycle and a position of the temperature control lever, in the dehumidifying mode, according to the third embodiment.
Figures 9, 10:
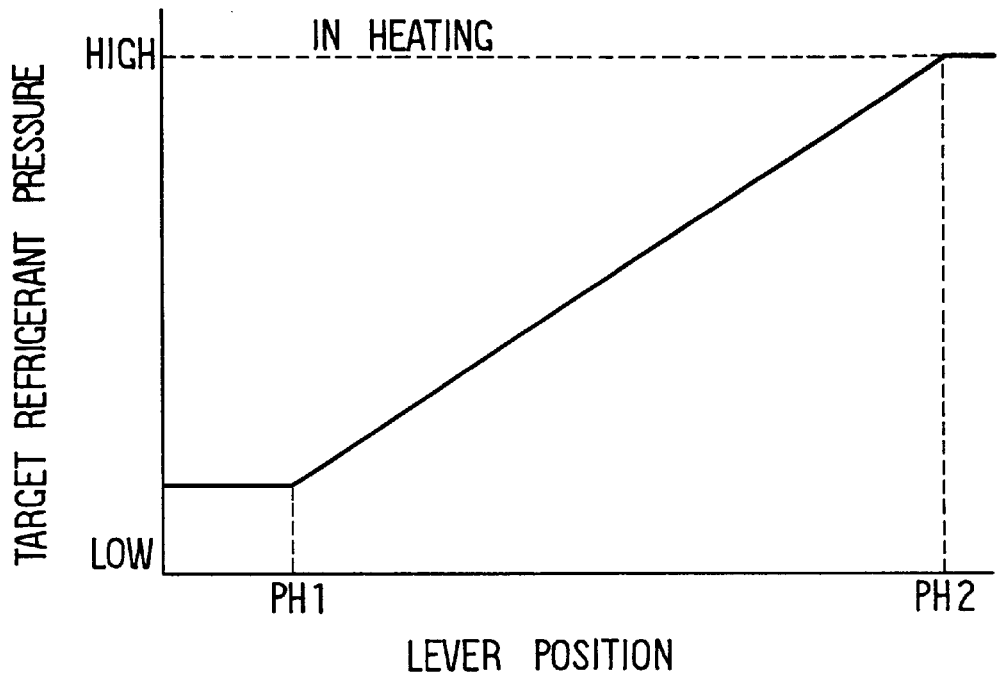
FIG. 9 is a graph showing the relationship between a target pressure of refrigerant discharged from the compressor of the refrigerant cycle and a position of the temperature control lever, in the heating mode, according to the third embodiment.
FIG. 10 is a table showing each operation of a four-way valve and electromagnetic valves in each mode of cooling, heating, dehumidifying and oil-discharging of the air conditioning apparatus according to the third embodiment.

Referring to FIG. 5, the air conditioning control panel 50 has a temperature contort lever 51 for setting a target temperature of air blown into the passenger compartment. In the third embodiment, the temperature control lever 51 sets a target rotation speed of the motor of the compressor 22. Further, the operations of the four-way valve 23 and the electromagnetic valves 28a, 28b are controlled according to the target rotation speed of the motor of the compressor 22, so that an operation mode of the refrigerant cycle 121 can be selected. As shown in FIG. 6, when the set position of the temperature control lever 51 moves from left to right, that is, when the set position of the temperature control lever 51 is changed from a position of PC1 to a position of PH2 in this order, a cooling mode, a dehumidifying mode and a heating mode can be selected in the refrigerant cycle 121 in this order. Further, by moving the position of the temperature control lever 51, a target temperature of air blown from the interior cooling heat exchanger 11 is set in the cooling mode as shown in FIG. 7, and a target pressure of refrigerant discharged from the compressor 22 of the refrigerant cycle 121 is set in the dehumidifying mode and in the heating mode, as shown in FIGS. 8, 9. A signal of the set position of the temperature control lever 51 is input to the control unit 40. Therefore, the control unit 40 controls the rotation speed of the motor of the compressor 22 so that the temperature of air blown from the interior cooling heat exchanger 11 or the pressure of refrigerant discharged from the compressor 22 of the refrigerant cycle 121, detected by the sensor group 41, are set to the above target values corresponding to the set position of the temperature control lever 51.

The control panel 50 further has a blown-air amount changing lever 52 for changing an amount of air blown by the blower 7, an air conditioning switch 53 for turning ON/OFF the compressor 22, an air outlet mode switching lever 54 for selecting an air outlet mode by controlling the opening and closing of the doors 18–20, and an inside/outside air switching lever 55 for setting an inside air introduction mode or an outside air introduction mode by the inside/outside air switching door 6. All the levers 51, 52, 54, 55 and the switch 53 provided in the control panel 50 are manually operated by a passenger in the passenger compartment.

Figure 11:
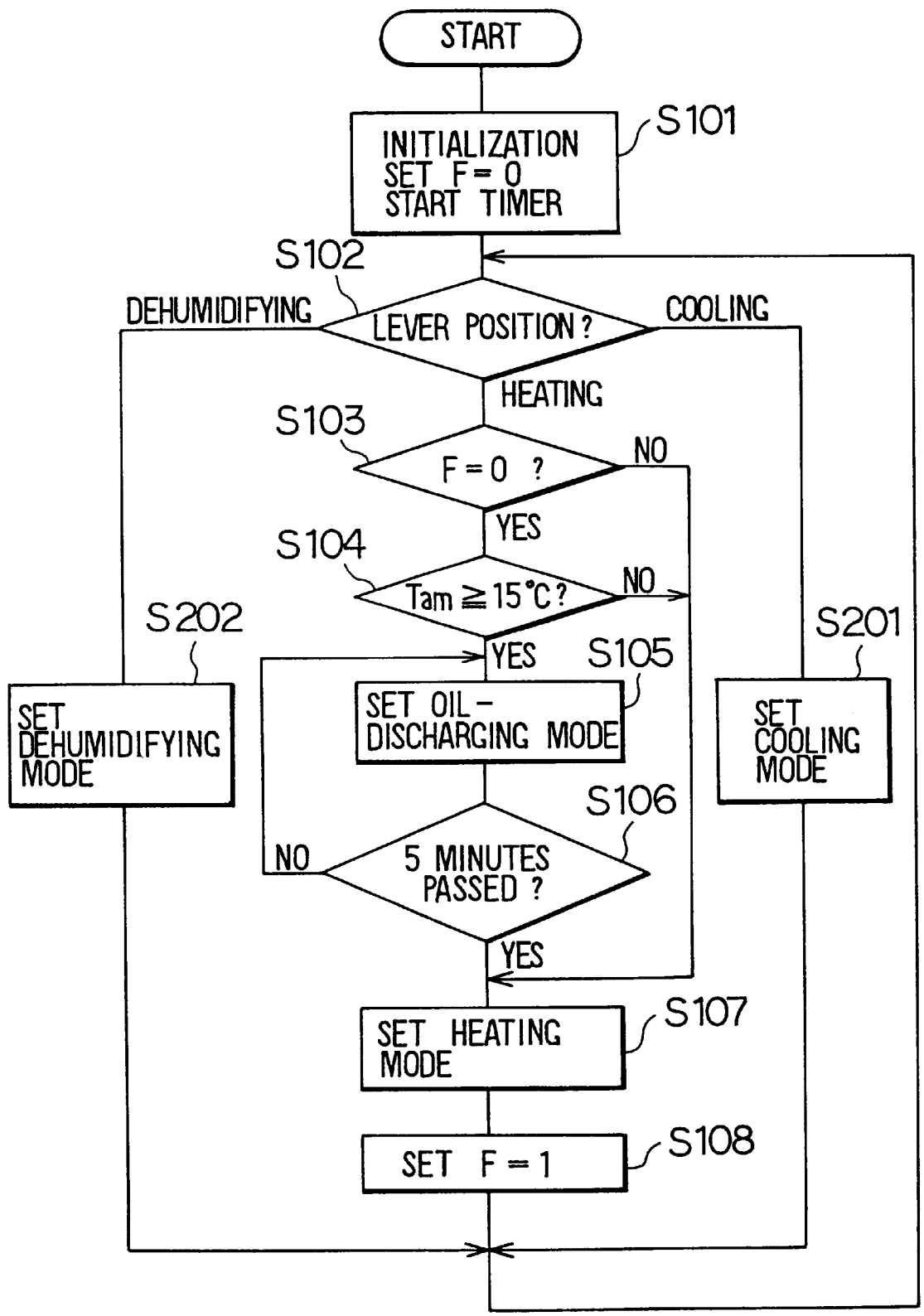
FIG. 11 is a flow chart showing a control process of the refrigerant cycle according to the third embodiment.

Next, operation of the refrigerant cycle 121 according to the third embodiment will be now described. FIG. 11 shows a control process of the microcomputer of the control unit 40. When the air conditioning switch 53 is turned ON, the control routine shown in FIG. 11 starts. At step S101, the refrigerant cycle 121 is initialized, a flag F is set to 0, and a timer starts. That is, in the third embodiment, when the air conditioning apparatus is turned ON, the flag F is set to 0. Next, the operation mode of the refrigerant cycle 121 is determined at step S102 according to the set position of the temperature control lever 51.

When the temperature control lever 51 is set to a position between PC1 and PC2 in FIGS. 6, 7, the cooling mode is set in the refrigerant cycle 121, and the control process of the control unit 41 proceeds to step S201. At step S201, the four-way valve 23 and the electromagnetic valves 28*a*, 28*b* of the refrigerant cycle 121 are set to the cooling mode in FIG. 10. That is, as shown in FIG. 10, in the cooling mode, the four-way valve 23 is operated at the cooling position indicated by arrow C in FIG. 4, the electromagnetic valve 28*a* is closed and the electromagnetic valve 28*b* is opened. As a result, refrigerant flows through the refrigerant cycle 121 as indicated by arrow C in FIG. 4.

That is, during the cooling mode, high-pressure high-temperature gas refrigerant discharged from the compressor 22 passes through the four-way valve 23 and the check valve 29*b* and flows into the exterior heat exchanger 24. The exterior heat exchanger 24 performs heat exchange between the gas refrigerant flowing therethrough and outside air blown by the outside fan 24*a* so that the gas refrigerant is condensed. Since the electromagnetic valve 28*a* is closed during the cooling mode, the condensed refrigerant from the external heat exchanger 24 passes through the check valve 29*d*, and is decompressed by the electrical expansion valve 26 to middle-pressure gas-liquid two-phase refrigerant. The middle-pressure gas-liquid refrigerant flows into the gas-liquid separator 25 and is separated into saturated gas refrigerant and saturated liquid refrigerant. The gas refrigerant is discharged from the gas-liquid separator 25 through the gas-refrigerant outlet 25*a*, and is introduced into the gas-injection port 22*c* through the gas-injection passage 22*d* and the check valve 29*e*. Thus, the middle-pressure gas refrigerant is injected into the compressor 22 at a compression-intermediate state from the gas-injection port 22*c*.

On the other hand, the liquid refrigerant in the gas-liquid separator 25 is discharged from a liquid-refrigerant outlet 25*b* of the gas-liquid separator 25, formed adjacent to a bottom of the gas-liquid separator 25, and is decompressed in the thermal expansion valve 27. The decompressed refrigerant passes through the electromagnetic valve 28*b*, and flows into the interior cooling heat exchanger 11. In the interior cooling heat exchanger 11, refrigerant is evaporated by absorbing heat from air blown by the blower 7 so that air is cooled. The air cooled by the interior cooling heat exchanger 11 is generally blown into the passenger compartment through the face air outlet 9. The gas refrigerant evaporated in the interior cooling heat exchanger 11 flows through the suction passage 22*e*, and is sucked into the compressor 22 from the inlet port 22*b*. At this time, the temperature detecting cylinder 27*a* disposed in the suction passage 22*e* detects a temperature of refrigerant sucked into the compressor 22, and sends a detection signal to the expansion valve 27. The expansion valve 27 adjusts quantity of refrigerant flowing into the interior cooling heat exchanger 11 so that refrigerant sucked into the compressor 22 has a predetermined super-heating degree.

When the temperature control lever 51 is set to a position between PD1 and PD2 shown in FIGS. 6, 8, the dehumidifying mode is selected and the control process proceeds to step S202. At step S202, the four-way valve 23 and the electromagnetic valves 28*a*, 28*b* are set at the dehumidifying mode in FIG. 10. In the dehumidifying mode, the four-way valve 23 is operated at the heating position, the electromagnetic valve 28*b* is opened, and the electromagnetic valve 28*a* is opened or closed. Therefore, refrigerant flows through the refrigerant cycle 121 as indicated by arrow D in FIG. 4. That is, gas refrigerant discharged from the compressor 22 passes through the four-way valve 23 and flows into the interior heating heat exchanger 12 to be condensed air blown by the blower 7. Therefore, air passing through the interior heating heat exchanger 12 is heated. The condensed refrigerant flowing from the interior heating heat exchanger 12 passes through the check valve 29*c*, and is decompressed by the electrical expansion valve 26 to middle-pressure gas-liquid two-phase refrigerant. The middle-pressure gas-liquid refrigerant flows into the gas-liquid separator 25, and is separated into gas refrigerant and liquid refrigerant in the gas-liquid separator 25. The gas refrigerant in the gas-liquid separator 25 is sucked into the gas-injection port 22*c* of the compressor 22 through the gas-refrigerant outlet 25*a* of the gas-liquid separator 25, the gas-injection passage 22*d*, and the check valve 29*e*.

On the other hand, the liquid refrigerant in the gas-liquid separator 25 flows out from the liquid-refrigerant outlet 25*b*, and is decompressed in the thermal expansion valve 27 to a low-pressure. When the electromagnetic valve 28*a* is closed, the low-pressure refrigerant flows into only the interior cooling heat exchanger 11 through the electromagnetic valve 28*b*, and is evaporated in the interior cooling heat exchanger 11 by absorbing heat from air blown by the blower 7. When the electromagnetic valve 28*a* is opened, the low-pressure refrigerant decompressed in the expansion valve 27 flows into the exterior heat exchanger 24 through the check valve 29a as indicated by arrow D in FIG. 4, and evaporates in the external heat exchanger 24 by absorbing heat from outside air. Simultaneously, the low-pressure refrigerant decompressed in the expansion valve 27 also flows into the interior cooling heat exchanger 11 through the electromagnetic valve 28b, and is evaporated by absorbing heat from air blown by the blower 7. The gas refrigerant from the interior cooling heat exchanger 11, or gas refrigerant from both the interior cooling heat exchanger 11 and the exterior heat exchanger 24 is sucked into the compressor 22.

During the dehumidifying mode, the electromagnetic valve 28a is opened and closed according to a temperature of air blown from the interior cooling heat exchanger 11. When the temperature of air blown from the interior cooling heat exchanger 11 is lower than the target air temperature (e.g., lower than Tam=5° C.), the electromagnetic valve 28a is closed so that refrigerant flows into only the interior cooling heat exchanger 11. When the temperature of air blown from the interior cooling heat exchanger 11 is higher than the target air temperature, the electromagnetic valve 28a is opened so that refrigerant flows into both the interior cooling heat exchanger 11 and the exterior heat exchanger 24. Therefore, heat-absorbing amount of refrigerant flowing through the interior cooling heat exchanger 11 is adjusted. Thus, the temperature of air blown from the interior cooling heat exchanger 11 is maintained at the target air temperature by controlling the heat-absorbing amount of refrigerant flowing through the interior cooling heat exchanger 11.

In the dehumidifying mode, refrigerant can flow into both the interior cooling heat exchanger 11 and the interior heating heat exchanger 12 so that air blown by the blower 7 is cooled and dehumidified in the interior cooling heat exchanger 11 firstly, and then is heated in the interior heating heat exchanger 12. Quantity of heat radiated by refrigerant in the interior heating heat exchanger 12 is equal to the sum of quantity of heat absorbed by refrigerant in the interior cooling heat exchanger 11 and consumption power of the compressor 22. Therefore, the temperature of air blown from the interior cooling heat exchanger 11 becomes higher than a temperature of air introduced into the air duct 2 from the air inlets 3, 4, 5. Thus, during the dehumidifying mode, the air conditioning apparatus can heat and dehumidify air to be blown into the passenger compartment, simultaneously.

Next, when the temperature control lever 51 is set to a position between PH1 and PH2 as shown in FIGS. 6, 9, the heating mode is selected at step S102 in FIG. 11, and the control process proceeds to step S103. At step S103, it is determined whether or not the flag F is 0. Since the flag F has been already set to 0 at step S101 when the air conditioning apparatus is turned ON, it is determined that the flag F is 0 at step S103. At step S104, it is determined whether or not an outside air temperature (Tam) is higher than or equal to a predetermined temperature (e.g., 15° C.) which corresponds to an outside air temperature during the spring or the fall. Step S104 is provided to determine whether or not the air conditioning apparatus is operated in the heating mode for a first time after being operated in the cooling mode for a certain period. That is, when the outside air temperature (Tam) is higher than or equal to the predetermined temperature (e.g., 15° C.), it is determined that the heating mode is a first heating operation switched from the cooling mode, and liquid refrigerant including lubricating oil staying in the interior cooling heat exchanger 11 needs to be discharged from the interior cooling heat exchanger 11. On the other hand, when the heating mode is not the first heating operation switched from the cooling mode, that is, when the first heating operation is previously performed, liquid refrigerant including lubricating oil in the interior cooling heat exchanger 11 has been already discharged from the interior cooling heat exchanger 11; and therefore, the oil discharging mode is not necessary to be set.

When it is determined that the outside air temperature is 15° C. or more at step S104, an oil discharging mode is performed so that the four-way valve 23 and electromagnetic valves 28a, 28b of the refrigerant cycle 121 are set as shown by the oil-discharging mode in FIG. 10. When the oil-discharging mode is set, the four-way valve 23 is operated to the heating position, and the both electromagnetic valves 28a, 28b are opened. Therefore, refrigerant not only flows through a refrigerant passage in the dehumidifying mode indicated by arrow D in FIG. 4, but also flows from the thermal expansion valve 27 to the exterior heat exchanger 24 through the check valve 29a because the electromagnetic valve 28a is opened. That is, in the oil-discharging mode, refrigerant decompressed by the thermal expansion valve 27 flows through both the interior cooling heat exchanger 11 and the exterior heat exchanger 24. As a result, liquid refrigerant including lubricating oil, which stays in the interior cooling heat exchanger 11 during the cooling mode, is discharged from the interior cooling heat exchanger 11 while being pushed by refrigerant flowing through the interior cooling heat exchanger 11, and is returned to the compressor 22. Further, since refrigerant flows through both the interior cooling heat exchanger 11 and the exterior heat exchanger 24, quantity of refrigerant flowing into the interior cooling heat exchanger 11 is decreased, thereby suppressing cooling performance of the air conditioning apparatus. It prevents heating performance of the air-conditioning apparatus from deteriorating due to excessive decrease in the temperature of air blown into the passenger compartment, at the starting time of the heating operation. That is, according to the third embodiment, during the oil-discharging mode, lubricating oil staying in the interior cooling heat exchanger 11 can be discharged from the interior cooling heat exchanger 11, while the heating performance for the passenger compartment is not affected at the starting time of the heating operation.

At step S106, it is determined whether or not a predetermined period (e.g., 5 minutes) has passed since the air conditioning apparatus is turned ON. When elapsed time is less than 5 minutes in the timer, the oil discharging mode continues at step S105 so that lubricating oil staying in the interior cooling heat exchanger 11 is completely discharged from the interior cooling heat exchanger 11. When the time more than 5 minutes have passed in the timer, the heating mode is set at step S107. That is, as shown in FIG. 10, the four-way valve 23 is operated at the heating position, the electromagnetic valve 28a is opened and the electromagnetic valve 28b is closed. As a result, during the heating mode, refrigerant flows through the refrigerant cycle 121 as indicated by arrow H in FIG. 4.

That is, during the heating mode, high-pressure high-temperature gas refrigerant discharged from the compressor 22 passes through the four-way valve 23 and flows into the interior heating heat exchanger 12. The interior heating heat exchanger 12 performs heat exchange between the gas refrigerant and air blown by the blower 7 so that the gas refrigerant is condensed to become liquid refrigerant and air is heated. Air heated in the interior heating heat exchanger 12 is blown into the passenger compartment. The liquid refrigerant from the interior heating heat exchanger 12 passes through the check valve 29c, and is decompressed in the electrical expansion valve 26 to middle-pressure gas-liquid two-phase refrigerant. The middle-pressure gas-liquid two-phase refrigerant flows into the gas-liquid separator 25 and is separated into gas refrigerant and liquid refrigerant. The gas refrigerant in the gas-liquid separator 25 is sucked into the compressor 22 from the gas-injection port 22$c$ through the gas-refrigerant outlet 25$a$, the gas-injection passage 22$d$ and the check valve 29$e$. The liquid refrigerant in the gas-liquid separator 25 flows from the liquid-refrigerant outlet 25$b$, is decompressed in the thermal expansion valve 27, and flows into the exterior heat exchanger 24 through the check valve 29$a$. In the exterior heat exchanger 24, refrigerant is evaporated by absorbing heat from outside air blown by the outside fan 24$a$. The gas refrigerant evaporated in the exterior heat exchanger 24 passes through the electromagnetic valve 28$a$ and the suction passage 22$e$, and is sucked into the compressor 22 through the inlet port 22$b$.

After setting the air conditioning apparatus to the heating mode at step S107, the control process proceeds to step S108. At step S108, the flag F is set to 1. Thereafter, the control process returns to step S102. Because the flag F is set to 1 after the heating mode is performed once, the flag F is not 0 at step S103 when the control process returns to S103 again, and the control process directly proceeds to step S107 without performing the oil-discharging mode. Thus, the heating mode continually set at step S107.

When the outside air temperature Tam is lower than the predetermined temperature (e.g., 15° C.) at step S104, it is determined that the heating mode has already been operated at least once after being switched from the cooling mode. In this case, the heating mode is directly set at step S107 without performing the oil-discharging mode.

A fourth preferred embodiment of the present invention will be described with reference to FIGS. 12–17. In the fourth embodiment, differences between the third embodiment and the fourth embodiment will be mainly described.

Figure 12:
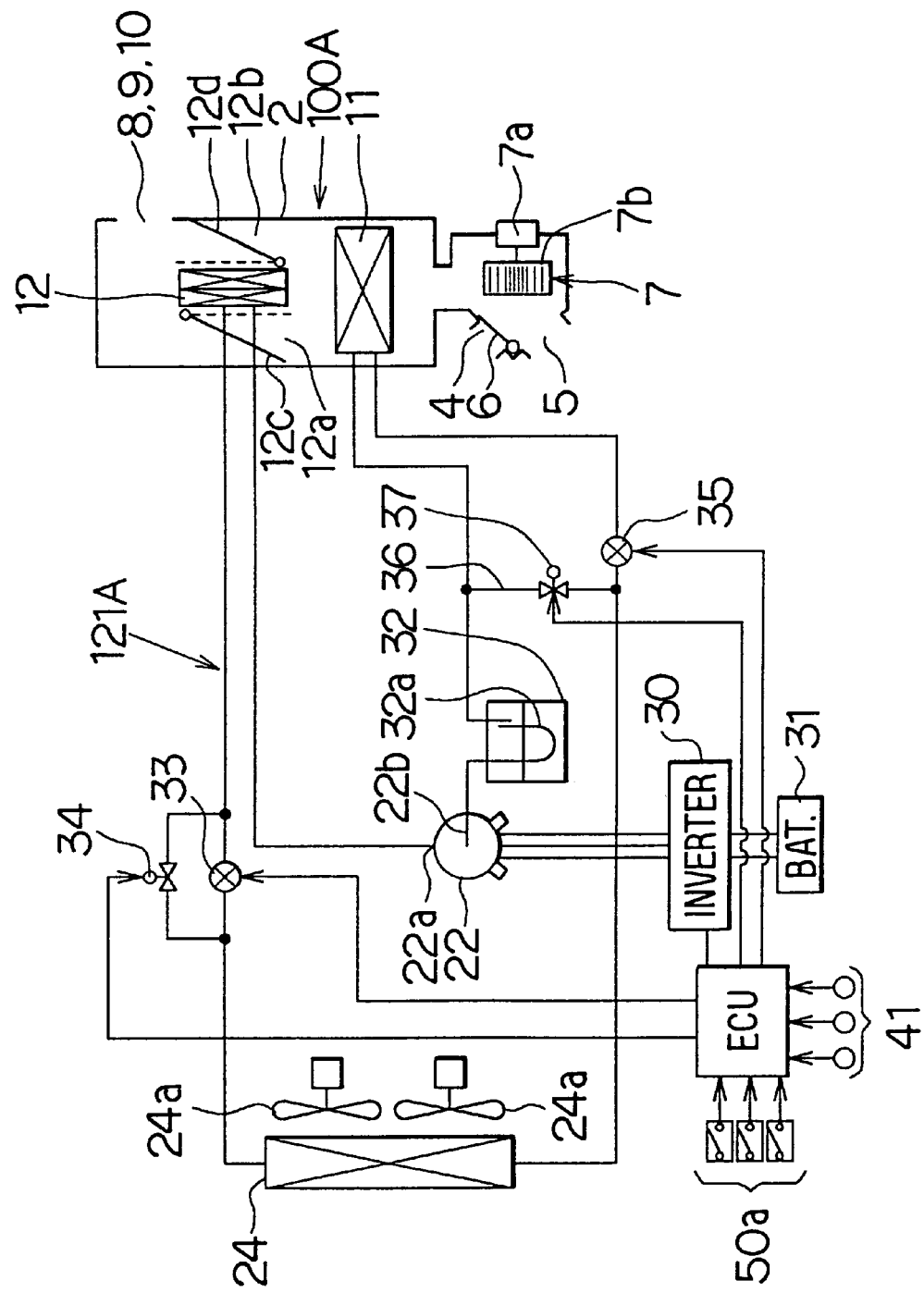
FIG. 12 is a schematic diagram showing a ventilation system and a refrigerant cycle of an air conditioning apparatus for a vehicle according to a fourth preferred embodiment of the present invention.

As shown in FIG. 12, in the fourth embodiment, the interior heating heat exchanger 12 for heating air is disposed in a middle portion of the air duct 2 of a ventilation system 100A. Bypass air passages 12$a$, 12$b$ are formed on both sides of the interior heating heat exchanger 12, and are opened and closed by switching doors 12$c$, 12$d$, respectively. Therefore, the amount of air passing through the interior heating heat exchanger 12 is adjusted by the switching doors 12$c$, 12$d$. That is, in the heating mode or in the dehumidifying mode of the air conditioning apparatus, the switching doors 12$c$, 12$d$ are rotated to the solid line positions in FIG. 12 so that air flows into the interior heating heat exchanger 12. On the other hand, in the cooling mode, the switching doors 12$c$, 12$d$ are rotated to the chain line positions in FIG. 12 so that air bypasses the interior heating heat exchanger 12 and flows through the bypass air passages 12$a$, 12$b$. In the fourth embodiment, a refrigerant cycle 121A is an accumulator cycle without a gas-injection function. That is, in the fourth embodiment, an accumulator 32 for separating gas-liquid two-phase refrigerant into gas refrigerant and liquid refrigerant is disposed on a suction side of the compressor 22. The gas refrigerant separated in the accumulator 32 is sucked from a gas-suction pipe 32$a$ into the compressor 22. Liquid refrigerant accumulated in the accumulator 32 is also sucked into the gas-suction pipe 32$a$ through a little suction hole (not shown) formed at a bottom of the gas-suction pipe 32$a$, and is also sucked into the compressor 22. In the refrigerant cycle 121A, an electrical expansion valve (first decompressing unit) 33 and an electromagnetic valve 34 are disposed in parallel between an outlet side of the interior heating heat exchanger 12 and an inlet side of the external heat exchanger 24. An electrical expansion valve (second decompressing unit) 35 is disposed between an outlet side of the exterior heat exchanger 24 and an inlet side of the interior cooling heat exchanger 11. A bypass passage 36 is provided between the outlet side of the exterior heat exchanger 24 (i.e., an inlet side of the cooling-side electrical expansion valve 35) and an inlet side of the accumulator 32, and an electromagnetic valve 37 is disposed in the bypass passage 36. Through the bypass passage 36, the outlet side of the exterior heat exchanger 24 (i.e., the inlet side of the cooling-side electrical expansion valve 35) directly communicates with the inlet side of the accumulator 32.

Figure 14:
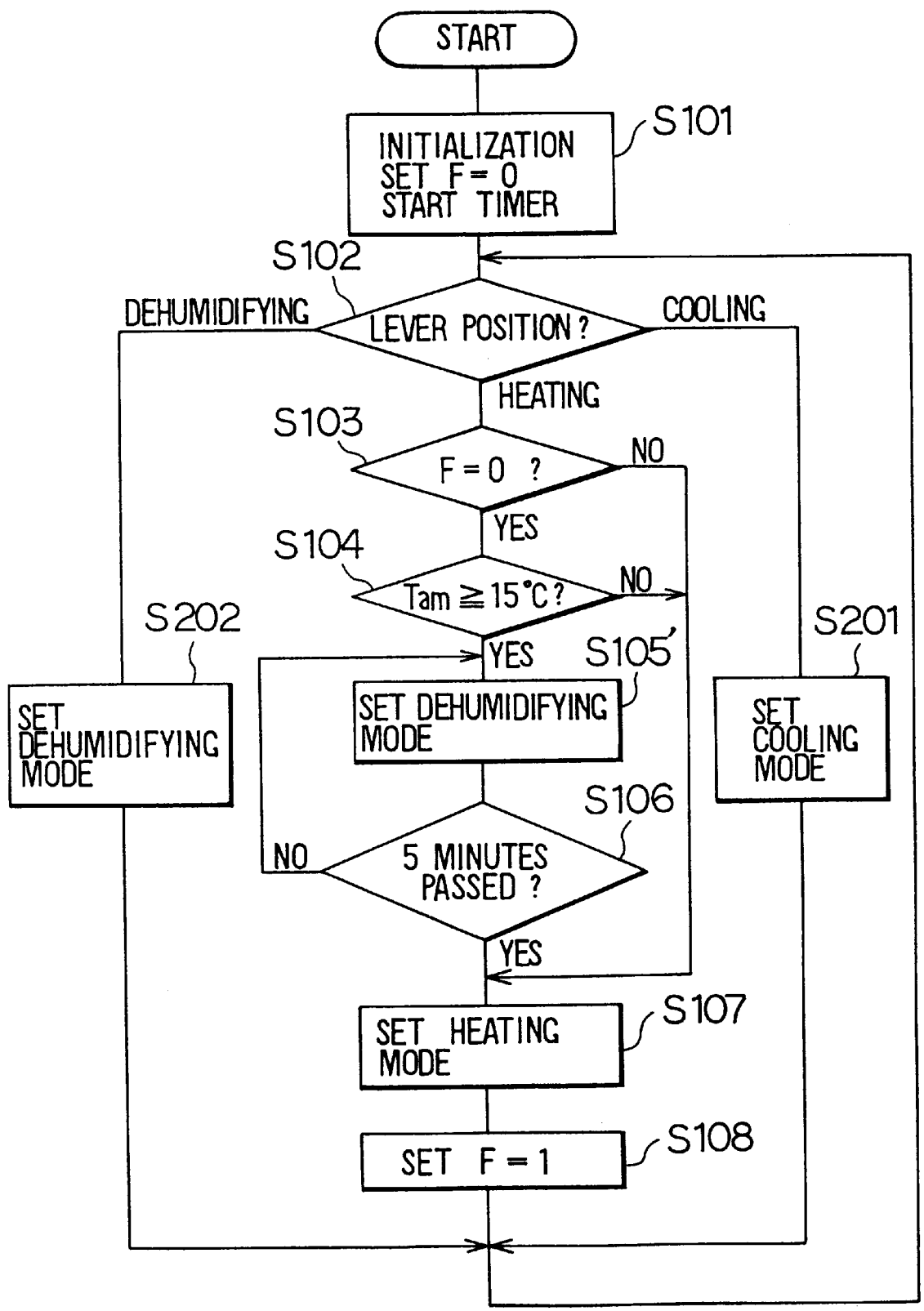
FIG. 14 is a flow chart showing a control process of the refrigerant cycle according to the fourth embodiment.

A control process of the refrigerant cycle 121A according to the fourth embodiment is shown in FIG. 14. In the fourth embodiment, step S105' is different from step S105 in FIG. 11 in the third embodiment. That is, in the fourth embodiment, the dehumidifying mode is set at step S105' instead of the oil-discharging mode in FIG. 11.

When the cooling mode is selected at step S102, the switching doors 12$c$, 12$d$ are operated to open the bypass air passages 12$a$, 12$b$ so that air bypasses the interior heating heat exchanger 12, the electromagnetic valve 34 is opened, and the electromagnetic valve 37 is closed at step S201, as shown in FIG. 13A. Therefore, in the refrigerant cycle 121A, refrigerant flows through the compressor 22, the interior heating heat exchanger 12, the electromagnetic valve 34, the exterior heat exchanger 24, the electrical expansion valve 35, the interior cooling heat exchanger 11, the accumulator 32 and the compressor 22 in this order. At this time, the interior heating heat exchanger 12 only functions as a refrigerant passage because air does not flow through the interior heating heat exchanger 12. Therefore, gas refrigerant discharged from the compressor 22 passes through the interior heating heat exchanger 12 and the electromagnetic valve 34, and is condensed in the exterior heat exchanger 24. The condensed refrigerant is decompressed in the electrical expansion valve 35 to low-pressure gas-liquid two-phase refrigerant. The low-pressure gas-liquid two-phase refrigerant is evaporated in the interior cooling heat exchanger 11 by absorbing heat from air in the air duct 2, and is introduced into the compressor 22 through the accumulator 32. Air in the air duct 2 is cooled by the interior cooling heat exchanger 11, and is blown into the passenger compartment of the vehicle through the bypass air passages 12$a$, 12$b$.

On the other hand, when the dehumidifying mode is selected at step S102, the switching doors 12$c$, 12$d$ are operated to close the bypass air passages 12$a$, 12$b$ so that air flows into the interior heating heat exchanger 12, and both the electromagnetic valves 34, 37 are opened at step S202, as shown in FIG. 13B. Therefore, in the refrigerant cycle 121A, as shown in FIG. 13B, refrigerant flows through the compressor 22, the interior heating heat exchanger 12, the electrical expansion valve 33, the exterior heat exchanger 24, the electrical expansion valve 35, the interior cooling heat exchanger 11, the accumulator 32 and the compressor 22 in this order. As a result, air in the air duct 2 is cooled by the interior cooling heat exchanger 11 and then is heated by the interior heating heat exchanger 12, resulting in that air is dehumidified. In the dehumidifying mode, refrigerant is decompressed in two steps by the heating-side expansion valve 33 and the cooling-side expansion valve 35. Therefore, the exterior heat exchanger 24 functions as an evaporator in which refrigerant absorbs heat from air, or functions as a condenser in which refrigerant radiates heat, according to opening degrees of the expansion valves 33, 35. That is, by adjusting the opening degrees of the expansion valves 33, 35, the external heat exchanger 24 is switched to the condenser or the evaporator. Thus, the high pressure of refrigerant discharged from the compressor 22 of the refrigerant cycle 121A can be controlled in the dehumidifying mode.

Figure 15:
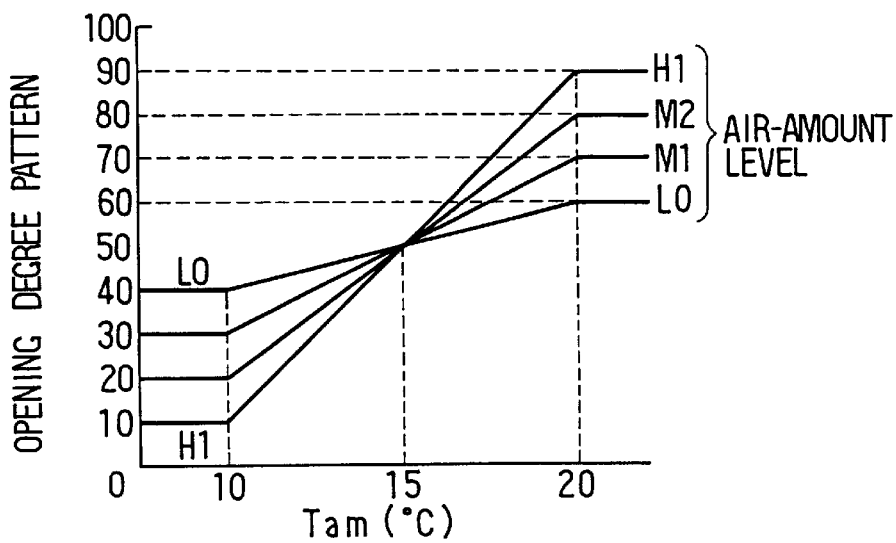
FIG. 15 is a control map showing the relationship between an opening-degree pattern of an expansion valve of the refrigerant cycle, an outside air temperature (Tam) and an air-amount level blown from a blower, according to the fourth embodiment.
Figure 16:
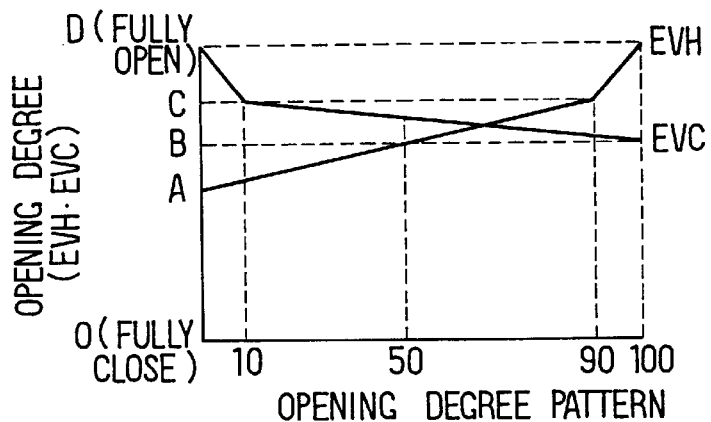
FIG. 16 is a control map for controlling an opening degree (EVH, EVC) of the expansion valve based on the opening degree pattern of FIG. 15, according to the fourth embodiment.
Figure 17:
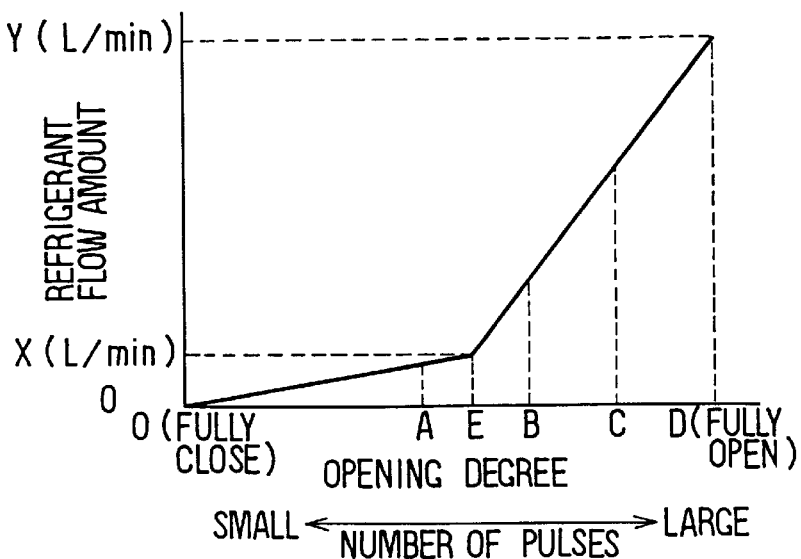
FIG. 17 is a control map for controlling an amount of refrigerant flowing through the expansion valve, according to the fourth embodiment.

Next, control of the opening degrees of the expansion valves 33, 35 will be described in detail. First, each opening-degree pattern of the expansion valves 33, 35 is determined based on the outside air temperature (Tam) and an air-amount level blown by the blower 7, according to a control map shown in FIG. 15. The control map shown in FIG. 15 is pre-stored in ROM of the microcomputer of the control unit 40. The air-amount level blown by the blower 7 increases from LO to HI as shown in FIG. 15. Next, an initial opening degree (EVH) of the expansion valve 33 and an initial opening degree (EVC) of the expansion valve 35 are determined based on the opening-degree pattern, according to a control map shown in FIG. 16. That is, the expansion valves 33, 35, respectively have refrigerant flow characteristics corresponding to the initial opening degrees (EVH, EVC). Each refrigerant amount flowing through the expansion valves 33, 35 corresponds to the opening degrees of the expansion valve 33, 35, and can be controlled by adjusting the number of pulses applied to a step motor of the expansion valves 33, 35, as shown in FIG. 17. When the number of pulses applied to the step motor is increased, the opening degrees of the expansion valves 33, 35 are increased, and each refrigerant amount flowing through the expansion valves 33, 35 are also increased.

After the initial opening degrees (EVH, EVC) of the expansion valves 33, 35 are set and the refrigerant cycle 121A starts, the opening degrees of the expansion valves 33, 35 are controlled so that the pressure of refrigerant discharged from the compressor 22 is set to a target pressure. That is, when the pressure of refrigerant discharged from the compressor 22 is larger than the target pressure, the opening degree pattern is increased. Due to the increase in the opening degree pattern, the opening degree (EVH) of the electrical expansion valve 33 is increased, and the opening degree (EVC) of the electrical expansion valve 35 is decreased. Accordingly, the exterior heat exchanger 24 becomes in a high-pressure side and radiates heat to air, and the pressure of refrigerant discharged from the compressor 22 is lowered to be equal to the target pressure. On the contrary, when the pressure of the refrigerant discharged from the compressor 22 is smaller than the target pressure, the opening degree pattern is decreased. Due to the decrease in the opening degree pattern, the opening degree (EVH) of expansion valve 33 is decreased, and the opening degree (EVC) of the expansion valve 35 is increased. Accordingly, the exterior heat exchanger 24 becomes in the low-pressure side of the refrigerant cycle 121A and absorbs heat from air, thereby increasing the pressure of refrigerant discharged from the compressor 22 to be equal to the target pressure. The temperature of air blown from the interior cooling heat exchanger 11 is also controlled to be equal to the target air temperature (e.g., Tam=5° C.) by controlling the rotation speed of the compressor 22.

When the heating mode is selected at step S102, the control process proceeds to step S103, S104. When the outside air temperature Tam is 15° C. or more, the dehumidifying mode is set at step S105' so that lubricating oil is discharged. The dehumidifying mode at step S105' is the same as the dehumidifying mode at step S202 described above. Therefore, at step S105', refrigerant flows through the compressor 22, the interior heating heat exchanger 12, the expansion valve 33, the exterior heat exchanger 24, the expansion valve 35, the interior cooling heat exchanger 11, the accumulator 32 and the compressor 22 in this order.

As a result, liquid refrigerant including lubricating oil, staying in the interior cooling heat exchanger 11 during the cooling mode, is discharged from the interior cooling heat exchanger 11 by refrigerant flowing through the interior cooling heat exchanger 11, and is returned to the compressor 22. Further, refrigerant flows through both the interior cooling heat exchanger 11 and the exterior heat exchanger 24 in series, and the exterior heat exchanger 24 functions as an evaporator in which refrigerant absorbs heat from air, by controlling the opening degrees of the expansion valves 33, 35. Therefore, the quantity of heat absorbed by refrigerant in the interior cooling heat exchanger 11, that is, cooling performance of the interior cooling heat exchanger 11 is suppressed. As a result, heating performance of the passenger compartment is prevented from deteriorating at the starting time of the heating operation.

Thus, in the fourth embodiment, the lubricating oil staying in the interior cooling heat exchanger 11 can be discharged from the interior cooling heat exchanger 11, while heating performance of the passenger compartment is not affected at the starting time of the heating operation. In the dehumidifying mode for oil-discharging at step S105', the opening degrees of the expansion valves 33, 35 are controlled similarly to the above-described dehumidifying mode. When the outside air temperature (Tam) is approximately 15° C., the opening degree (EVH) of the expansion valve 33 is set to be smaller than the opening degree (EVC) of the expansion valve 35. As a result, in this case, the exterior heat exchanger 24 becomes in the low-pressure side of the refrigerant cycle 121A, and is used as the evaporator.

Referring to FIG. 14, after the dehumidifying mode for oil-discharging has been set for a predetermined period, the heating mode is set in the refrigerant cycle 121A at step S107. That is, as shown in FIG. 13C, the switching doors 12c, 12d are rotated to close the bypass air passages 12c, 12d so that air flows through the interior heating heat exchanger 12, the electromagnetic valve 34 is closed and the electromagnetic valve 37 is opened. As a result, in the heating mode, refrigerant flows through the compressor 22, the interior heating heat exchanger 12, the expansion valve 33, the exterior heat exchanger 24, the electromagnetic valve 37 (i.e., bypass passage 36), the accumulator 32 and the compressor 22, in this order. Thus, refrigerant decompressed in the expansion valve 33 to a low-pressure is evaporated in the exterior heat exchanger 24 by absorbing heat from air, and then radiates condensation heat in the interior heating heat exchanger 12 so that air to be blown into the passenger compartment is heated.

Although the present invention has been fully described in connection with preferred embodiments thereof with reference to the accompanying drawings, it is to be noted that various changes and modifications will become apparent to those skilled in the art.

For example, the gas-liquid separator 25, 25A described in the first and second embodiments may be applied to the invention of the third and fourth embodiments.

In each of the above-described third and fourth embodiments, the rotation speed of the compressor 22 may be forcibly increased and maintained to a preset rotation speed (e.g., 2000 rpm) or more at steps S105 and S105' so that circulating amount of refrigerant is increased in the refrigerant cycle 121, 121A. That is, by increasing the circulating amount of refrigerant at steps S105, S105', lubricating oil staying in the interior cooling heat exchanger 11 may be discharged.

In each of the above-described third and fourth embodiments, when the heating mode is set, it is determined whether or not the outside air temperature (Tam) is 15° C. or more at step S104 to determine whether or not the oil-discharging mode is necessary. However, it may be determined that the oil-discharging mode is necessary when a calculated target temperature (TAO) of air blown into the passenger compartment is higher than a predetermined temperature.

The present invention is not limited to a refrigerant cycle system of an air conditioning apparatus for a vehicle, but also applied to other refrigerant cycles for various use.

Such changes and modifications are to be understood as being within the scope of the present invention as defined by the appended claims.

What is claimed is:

1. A refrigerant cycle system for an air conditioning apparatus for a vehicle having a passenger compartment, said refrigerant cycle system comprising:

an interior heat exchanger, disposed inside the passenger compartment, for performing heat-exchange between air to be blown into the passenger compartment and refrigerant flowing therethrough;

an exterior heat exchanger, disposed outside the passenger compartment, for performing heat-exchange between air outside the passenger compartment and refrigerant flowing therethrough;

a compressor for compressing refrigerant, said compressor having an inlet port for introducing therein low-pressure refrigerant, a gas-injection port for introducing therein a middle-pressure gas refrigerant at a compression-intermediate state, and an outlet port for discharging compressed high-pressure refrigerant;

a first decompressing unit for reducing a pressure of refrigerant to a middle-pressure;

a gas-liquid separator for separating middle-pressure refrigerant decompressed by said first decompressing unit into gas refrigerant and liquid refrigerant;

a second decompressing unit for decompressing liquid refrigerant separated by said gas-liquid separator; and a gas-injection pipe for introducing gas refrigerant separated by said gas-liquid separator into said gas-injection port of said compressor, wherein:

said gas-liquid separator includes a liquid-suction pipe for introducing liquid refrigerant into said second decompressing unit, and gas-suction pipe for introducing gas refrigerant into said gas-injection pipe;

said liquid-suction pipe has an open end opened in liquid refrigerant within said gas-liquid separator;

said gas-suction pipe is approximately a straight pipe;

said open end of said gas-suction pipe is formed at an upper end of said straight said suction hole is formed at a lower side of said straight pipe to be adjacent to a bottom of said gas-liquid separator;

said gas-suction pipe has an open end opened in gas refrigerant within said gas-liquid separator, and a middle pipe portion which is immersed in liquid refrigerant within said gas-liquid separator and has a suction hole through which liquid refrigerant is sucked into said gas-suction pipe; and said suction hole is provided in said middle pipe portion of said gas-suction pipe at a position lower than said open end of said liquid-suction pipe.

2. The refrigerant cycle system according to claim 1, wherein:

said first decompressing unit is an electrical expansion valve for controlling the middle pressure of refrigerant; and said second decompressing unit is a thermal expansion valve which adjusts a super-heating degree of refrigerant to be sucked into said inlet port of said compressor.

3. The refrigerant cycle system according to claim 1, wherein said interior heat exchanger includes a cooling heat exchanger for cooling air passing therethrough, and a heating heat exchanger for heating air passing therethrough.

4. A refrigerant cycle system for an air conditioning apparatus for a vehicle having a passenger compartment, said refrigerant cycle system comprising:

an interior heat exchanger, disposed inside the passenger compartment, for performing heat-exchange between air to be blown into the passenger compartment and refrigerant flowing therethrough, said interior heat exchanger including a cooling heat exchanger for cooling air passing therethrough, and a heating heat exchanger for heating air passing therethrough;

an exterior heat exchanger, disposed outside the passenger compartment, for performing heat-exchange between air outside the passenger compartment and refrigerant flowing therethrough;

a compressor for compressing refrigerant, said compressor having an inlet port for introducing therein low-pressure refrigerant, a gas-injection port for introducing therein a middle-pressure gas refrigerant at a compression-intermediate state, and an outlet port for discharging compressed high-pressure refrigerant;

a first decompressing unit for reducing a pressure of refrigerant to a middle-pressure;

a gas-liquid separator for separating middle-pressure refrigerant decompressed by said first decompressing unit into gas refrigerant and liquid refrigerant;

a second decompressing unit for decompressing liquid refrigerant separated by said gas-liquid separator; and a gas-injection pipe for introducing gas refrigerant separated by said gas-liquid separator into said gas-injection port of said compressor;

a control unit for setting a cooling mode in which air blown into the passenger compartment is cooled by said cooling heat exchanger, a heating mode in which air blown into the passenger compartment is heated by said heating heat exchanger, and a dehumidifying mode in which air blown into the passenger compartment is dehumidified by said cooling heat exchanger and said heating heat exchanger, wherein:

said gas-liquid separator includes a liquid-suction pipe for introducing liquid refrigerant into said second decompressing unit, and a gas-suction pipe for introducing gas refrigerant into said gas-injection pipe;

said liquid-suction pipe has an open end opened in liquid refrigerant within said gas-liquid separator;

said gas-suction pipe has an open end opened in gas refrigerant within said gas-liquid separator, and a middle pipe portion which is immersed in liquid refrigerant within said gas-liquid separator and has a suction hole through which liquid refrigerant is sucked into said gas-suction pipe; and said suction hole is provided in said middle pipe portion of said gas-suction pipe at a position lower than said open end of said liquid-suction pipe;

said control unit includes:

determining means for determining whether or not an oil-discharging operation for discharging lubricating oil staying in said cooling heat exchanger into said compressor is necessary at a starting time of said heating mode, oil-discharging operation setting means for setting said oil-discharging operation when said determining means determines that said oil-discharging operation is necessary, and heating mode setting means for setting said heating mode after said oil-discharging operation is performed for a predetermined period, when said determining means determines that said oil-discharging operation is necessary.

5. The refrigerant cycle system according to claim 4, wherein said control unit controls a flow of refrigerant in such a manner that gas refrigerant discharged from said compressor is condensed in said heating heat exchanger, is decompressed in said first and second decompressing units, passes through both said exterior heat exchanger and said cooling heat exchanger in parallel, and is introduced into said compressor, when said oil-discharging operation setting means sets said oil-discharging operation.

6. The refrigerant cycle system according to claim 5, wherein said control unit controls the flow of refrigerant in such a manner that gas refrigerant discharged from said compressor is condensed by said heating heat exchanger, is decompressed by said first and second decompressing units, is evaporated by said cooling heat exchanger, and is introduced into said compressor, when said dehumidifying mode is set.

7. The refrigerant cycle system according to claim 4, wherein said control unit controls the flow of refrigerant in such a manner that gas refrigerant discharged from said compressor is condensed by said heating heat exchanger, is decompressed by said first and second decompressing units, is evaporated by both said cooling heat exchanger and said exterior heat exchanger, and is introduced into said compressor, when said dehumidifying mode is set;

said control unit sets said dehumidifying mode, when said determining means determines that said oil-discharging operation is necessary.

8. The refrigerant cycle system according to claim 4, wherein said control unit increases a rotation speed of said compressor to be higher than a predetermined value, when said determining means determines that s aid oil-discharging operation is necessary.

9. The refrigerant cycle system according to claim 4, wherein:

said control unit includes an outside air temperature sensor for detecting a temperature of outside air; and said determining means determines that the oil-discharging operation is necessary when the temperature of outside air detected by said outside air temperature sensor is higher than a predetermined temperature at a starting time of said heating mode.

10. A gas-liquid separator for a refrigerant cycle having a compressor for compressing refrigerant, said gas-liquid separator, for separating gas-liquid refrigerant into gas refrigerant and liquid refrigerant, comprising:

a refrigerant case for receiving refrigerant therein;

an inlet pipe through which gas-liquid refrigerant in the refrigerant cycle is introduced into said refrigerant case;

a liquid-suction pipe through which liquid refrigerant within said refrigerant case is supplied to the refrigerant cycle; and a gas-suction pipe through which gas refrigerant within said refrigerant case is introduced into the compressor at an intermediate-compression state, wherein:

said gas-suction pipe is approximately a straight pipe;

said open end of said gas-suction pipe is formed at an upper end of said straight said suction hole is formed at a lower side of said straight pipe to be adjacent to a bottom of said refrigerant case;

said liquid-suction pipe has an open end opened in liquid refrigerant within said refrigerant case;

said gas-suction pipe has an open end opened in gas refrigerant within said refrigerant case, and a middle pipe portion which is immersed in liquid refrigerant within said refrigerant case and has a suction hole through which liquid refrigerant is sucked into said gas-suction pipe; and said suction hole is provided in said middle pipe portion at a position lower than said open end of said liquid-suction pipe.

11. An air conditioning apparatus for a vehicle having a passenger compartment, said air conditioning apparatus comprising:

an air duct for forming an air passage through which air is blown into the passenger compartment;

a blower for blowing air into said air passage;

a refrigerant cycle for circulating refrigerant, said refrigerant cycle including a cooling heat exchanger, disposed in said air passage, for cooling air in said air passage, a heating heat exchanger, disposed in said air passage at a downstream air side of said cooling heat exchanger, for heating air in said air passage, an exterior heat exchanger, disposed outside said air duct, for performing heat-exchange between air outside the passenger compartment and refrigerant flowing therethrough, a compressor for compressing refrigerant, and a decompressing unit for reducing a pressure of refrigerant; and a control unit for setting a cooling mode in which air blown into the passenger compartment is cooled by said cooling heat exchanger, a heating mode in which air blown into the passenger compartment is heated by said heating heat exchanger, and a dehumidifying mode in which air blown into the passenger compartment is dehumidified by said cooling heat exchanger and said heating heat exchanger, wherein said control unit includes determining means for determining whether or not an oil-discharging operation for discharging lubricating oil staying in said cooling heat exchanger into said compressor is necessary at a starting time of said heating mode, oil-discharging operation setting means for setting said oil-discharging operation when said determining means determines that said oil-discharging operation is necessary, and heating mode setting means for setting said heating mode after said oil-discharging operation is performed for a predetermined period, when said determining means determines that the oil-discharging operation is necessary.

12. The air conditioning apparatus according to claim 11, wherein said control unit controls a flow of refrigerant in such a manner that gas refrigerant discharged from said compressor is condensed in said heating heat exchanger, is decompressed in said decompressing unit, passes through both said exterior heat exchanger and said cooling heat exchanger in parallel, and is introduced into said compressor, when said oil-discharging operation setting means sets said oil-discharging operation.

13. The air conditioning apparatus according to claim 11, wherein:

said control unit controls the flow of refrigerant in such a manner that gas refrigerant discharged from said compressor is condensed by said heating heat exchanger, is decompressed by said decompressing unit, is evaporated by both said cooling heat exchanger and said exterior heat exchanger, and is introduced into said compressor, when said dehumidifying mode is set; and said control unit sets said dehumidifying mode, when said determining means determines that said oil-discharging operation is necessary.

14. The air conditioning apparatus according to claim 11, wherein:

said decompressing unit includes first decompressing means and second decompressing means;

said control unit controls the flow of refrigerant in such a manner that gas refrigerant discharged from said compressor is condensed by said heating heat exchanger, is decompressed by said first decompressing means, passes through said exterior heat exchanger, is decompressed again by said second decompressing means, is evaporated by said cooling heat exchanger, and is introduced into said compressor, when said dehumidifying mode is set; and said control unit sets said dehumidifying mode, when said determining means determines that said oil-discharging operation is necessary.

15. The air conditioning apparatus according to claim 11, wherein said control unit increases a rotation speed of said compressor to be higher than a predetermined value, when said determining means determines that said oil-discharging operation is necessary.

16. The air conditioning apparatus according to claim 11, wherein:

said control unit includes an outside air temperature sensor for detecting a temperature of outside air; and said determining means determines that the oil-discharging operation is necessary when the temperature of outside air detected by said outside air temperature sensor is higher than a predetermined temperature at a starting time of said heating mode.

* * * * *